US007639849B2

(12) United States Patent
Kimpe et al.

(10) Patent No.: US 7,639,849 B2
(45) Date of Patent: Dec. 29, 2009

(54) METHODS, APPARATUS, AND DEVICES FOR NOISE REDUCTION

(75) Inventors: Tom Kimpe, Ghent (BE); Paul Matthijs, Eke (BE)

(73) Assignee: Barco N.V., Kortrijk (BE)

( * ) Notice: Subject to any disclaimer, the term of this patent is extended or adjusted under 35 U.S.C. 154(b) by 929 days.

(21) Appl. No.: 11/134,522

(22) Filed: May 23, 2005

(65) Prior Publication Data

US 2006/0262147 A1 Nov. 23, 2006

Related U.S. Application Data

(60) Provisional application No. 60/681,429, filed on May 17, 2005.

(51) Int. Cl.
*G06K 9/00* (2006.01)
*G09G 5/10* (2006.01)

(52) U.S. Cl. ...................................... 382/128; 345/690

(58) Field of Classification Search ......... 382/128-134, 382/189, 214; 600/407, 425; 345/156, 180, 345/182, 183, 204, 619, 659, 689, 88, 89, 345/207, 690, 903, 904
See application file for complete search history.

(56) References Cited

U.S. PATENT DOCUMENTS

| | | | | |
|---|---|---|---|---|
| 5,208,689 | A | 5/1993 | Hartmann | |
| 5,225,919 | A | 7/1993 | Nakao | |
| 5,359,342 | A * | 10/1994 | Nakai et al. | 345/89 |
| 5,621,821 | A * | 4/1997 | Pearman et al. | 382/254 |
| 5,706,816 | A * | 1/1998 | Mochizuki et al. | 600/443 |
| 5,708,451 | A | 1/1998 | Baldi | |
| 6,089,739 | A | 7/2000 | Yamamoto | |
| 6,115,092 | A | 9/2000 | Greene | |
| 6,154,561 | A * | 11/2000 | Pratt et al. | 382/141 |
| 6,704,008 | B2 * | 3/2004 | Naito et al. | 345/207 |
| 6,782,137 | B1 * | 8/2004 | Avinash | 382/254 |
| 2001/0024178 | A1 | 9/2001 | Takeuchi | |
| 2001/0041489 | A1 | 11/2001 | Takeuchi et al. | |
| 2002/0047568 | A1 | 4/2002 | Koyama | |
| 2002/0154076 | A1 | 10/2002 | Greene | |
| 2004/0174320 | A1 | 9/2004 | Matthijs | |

FOREIGN PATENT DOCUMENTS

| | | | |
|---|---|---|---|
| EP | 03078717.0 | | 11/2003 |
| EP | 1424672 | A1 | 6/2004 |
| WO | WO 03/100756 | A2 | 12/2003 |

OTHER PUBLICATIONS

European Patent Office. Search report for European application No. 02447233.4, dated Apr. 29, 2003 (3 pp.).

(Continued)

*Primary Examiner*—Abolfazl Tabatabai
(74) *Attorney, Agent, or Firm*—Hartman Patents PLLC

(57) ABSTRACT

Embodiments include applying a compensation to an image signal based on nonuniformity of a display device. The compensation is based on information about variations in light-output response among elements of the display device. The compensation is also modified based on a characteristic of a desired use of the display.

37 Claims, 16 Drawing Sheets

OTHER PUBLICATIONS

European Patent Office. Examination report for European application No. 02447233.4, dated Apr. 11, 2005 (7 pp.).

European Patent Office. Examination report for European application No. 02447233.4, dated Nov. 14, 2005 (6 pp.).

Digital Imaging and Communications in Medicine (DICOM) Part 14: Grayscale Standard Display Function. 1988, 16 pp. (cover, i-iii, 1-12), Nat'l Elec. Mfgrs. Assoc. Rosslyn, VA.

* cited by examiner

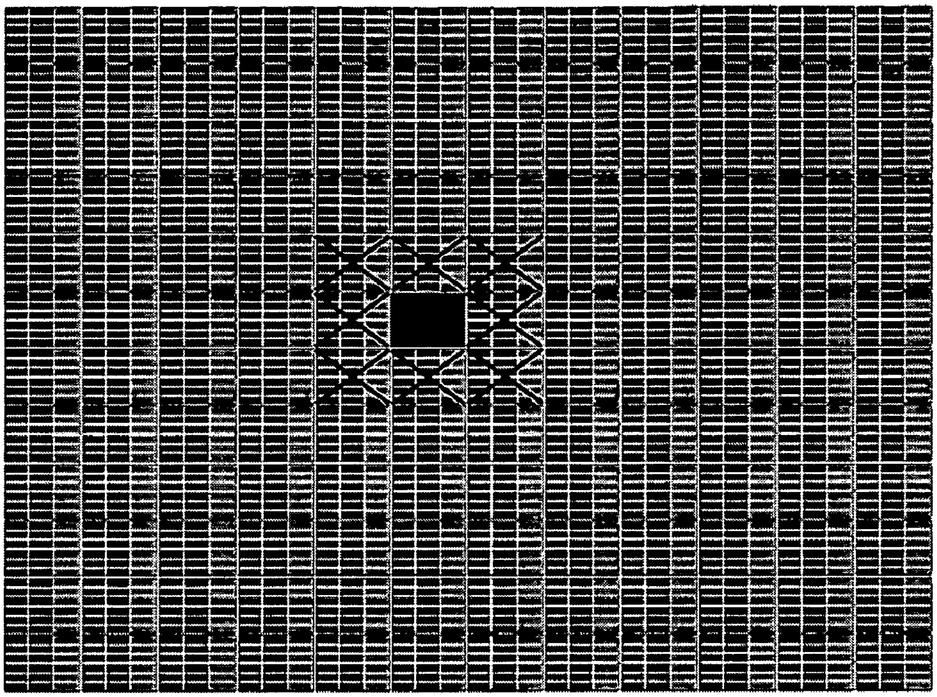
FIG. 14
FIG. 15
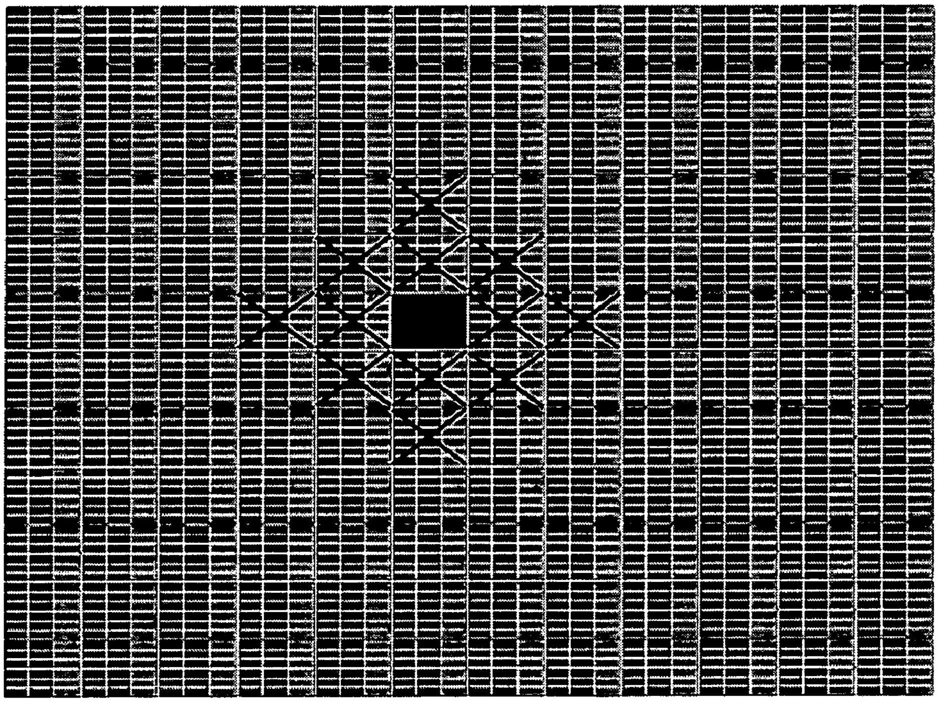

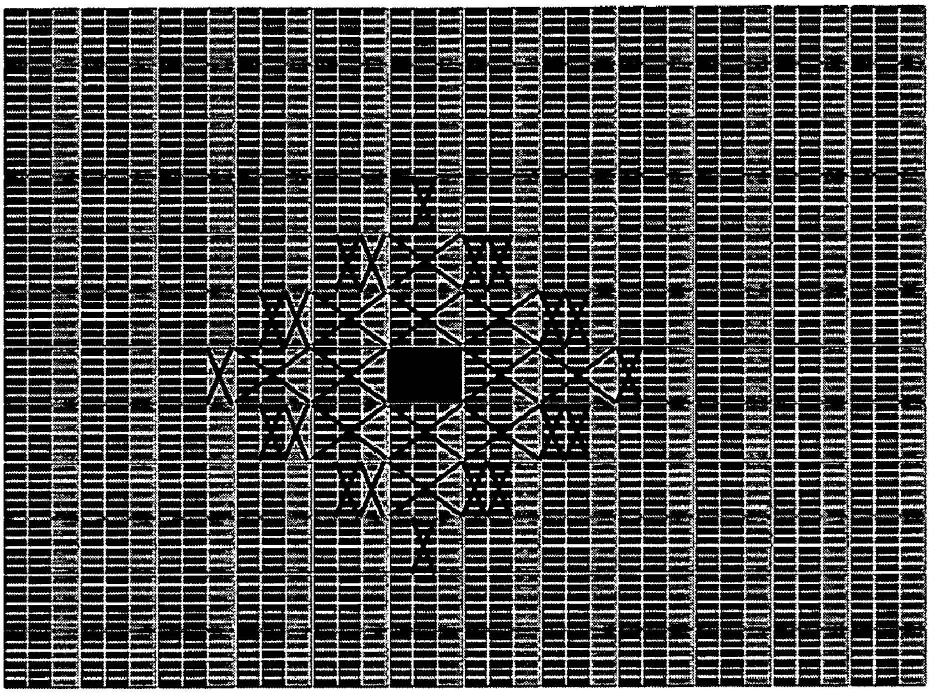
FIG. 16
FIG. 17
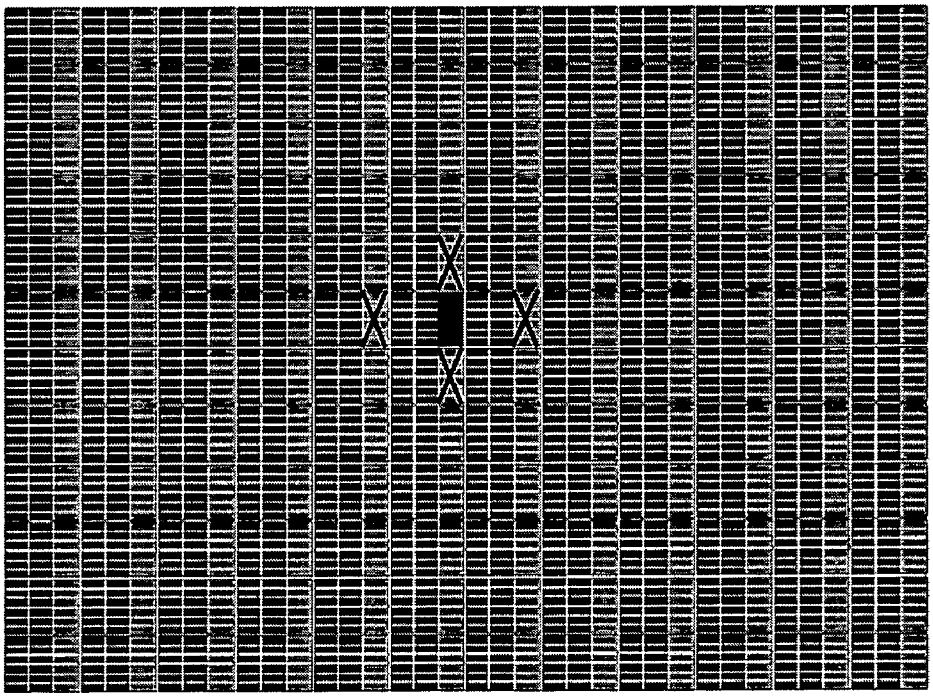

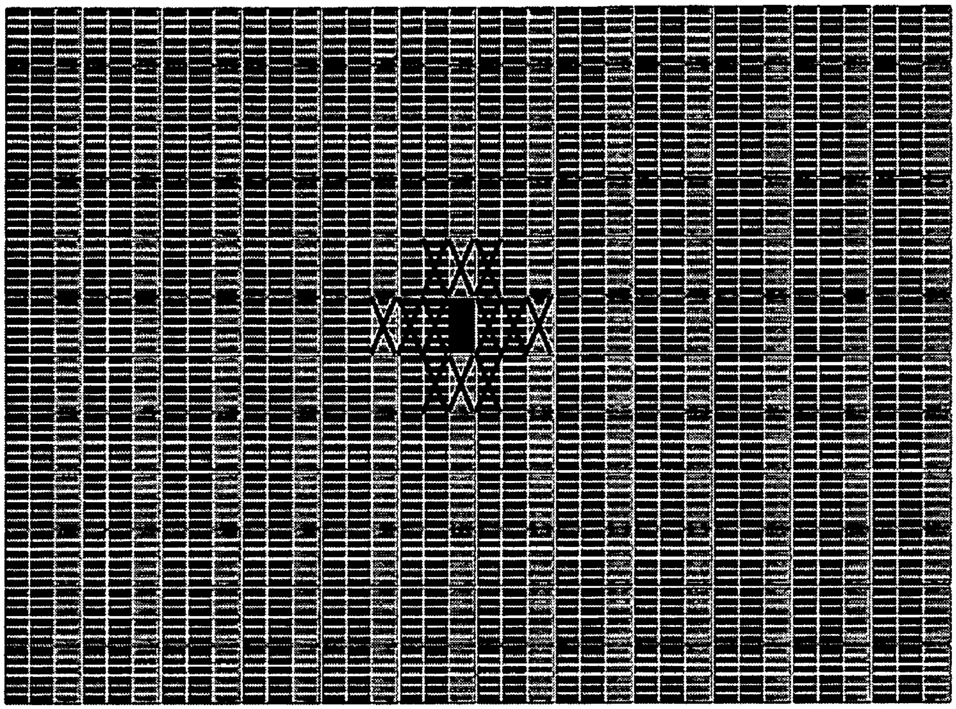
FIG. 18
FIG. 19
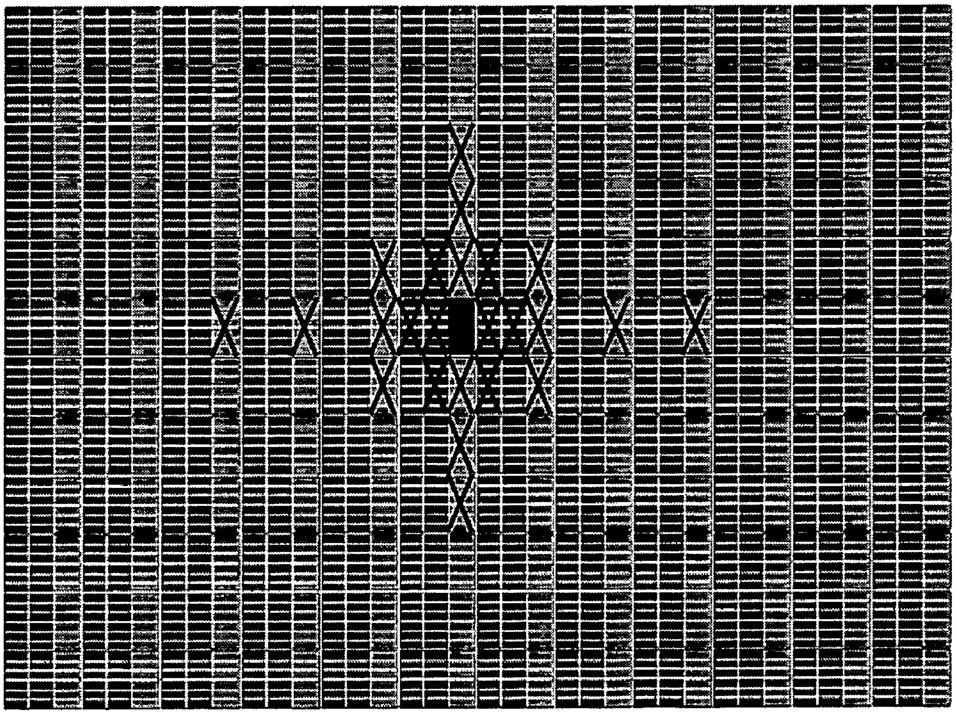

METHODS, APPARATUS, AND DEVICES FOR NOISE REDUCTION

RELATED APPLICATIONS

This application claims benefit of U.S. Provisional Patent Application No. 60/681,429, entitled "METHODS, APPARATUS, AND DEVICES FOR NOISE REDUCTION," filed May 17, 2005.

FIELD OF THE INVENTION

This invention relates to image display.

BACKGROUND

Image noise is an important parameter in the quality of medical diagnosis. Several scientific studies have indicated that even slight increase of noise in medical images can have a significant negative impact on the accuracy and quality of medical diagnosis. In a typical medical imaging system there are several phases, and in each of these phases unwanted noise can be introduced. The first phase is the actual modality or source that produces the medical image. Examples of such modalities include X-ray machines, computed tomography (CT) scanners, ultrasound scanners, magnetic resonance imaging (MRI) scanners, and positron emission tomography (PET) scanners. As for any sensor system or measurement device, there is always some amount of measurement noise present due to imperfections of the device or even due to physical limitations (such as statistical uncertainty). A lot of effort has been put into devices that produce low-noise images or image data. For example, images from digital detectors (very alike to CCDs in digital cameras) used for X-rays are post-processed to remove noise by means of flat field correction and dark field correction.

Once the medical image is available, this image is to be viewed by a radiologist. Traditionally light boxes were used in combination with film, but nowadays more and more display systems (first CRT-based and afterwards LCD-based) are used for this task. The introduction of those digital display systems not only improved the workflow efficiency a lot but also opened new possibilities to improve medical diagnosis. For example: with display systems it becomes possible for the radiologist to perform image processing operations such as zoom, contrast enhancement, and computer assistance (computer aided diagnosis or CAD). However, also significant disadvantages of medical display systems cannot be neglected.

Contrary to extremely low noise film, display systems suffer from significant noise. Matrix based or matrix addressed displays are composed of individual image forming elements, called pixels (Picture Elements), that can be driven (or addressed) individually by proper driving electronics. The driving signals can switch a pixel to a first state, the on-state (luminance emitted, transmitted or reflected), to a second state, the off-state (no luminance emitted, transmitted or reflected). For some displays, one stable intermediate state between the first and the second state is used—see EP 462 619 which describes an LCD. For still other displays, one or more intermediate states between the first and the second state (modulation of the amount of luminance emitted, transmitted or reflected) are used. A modification of these designs attempts to improve uniformity by using pixels made up of individually driven sub-pixel areas and to have most of the sub-pixels driven either in the on- or off-state—see EP 478 043 which also describes an LCD. One sub-pixel is driven to provide intermediate states. Due to the fact that this sub-pixel only provides modulation of the grey-scale values determined by selection of the binary driven sub-pixels the luminosity variation over the display is reduced.

A known image quality deficiency existing with these matrix based technologies is the unequal light-output response of the pixels that make up the matrix addressed display consisting of a multitude of such pixels. More specifically, identical electric drive signals to various pixels may lead to different light-output output of these pixels. Current state of the art displays have pixel arrays ranging from a few hundred to millions of pixels. The observed light-output differences between (even neighboring) pixels is as high as 30% (as obtained from the formula (minimum luminance−maximum luminance)/minimum luminance).

These differences in behavior are caused by various production processes involved in the manufacturing of the displays, and/or by the physical construction of these displays, each of them being different depending on the type of technology of the electronic display under consideration. As an example, for liquid crystal displays (LCDs), the application of rubbing for the alignment of the liquid crystal (LC) molecules, and the color filters used, are large contributors to the different luminance behavior of various pixels. The problem of lack of uniformity of OLED displays is discussed in US 20020047568. Such lack of uniformity may arise from differences in the thin film transistors used to switch the pixel elements.

EP 0755042 (U.S. Pat. No. 5,708,451) describes a method and device for providing uniform luminosity of a field emission display (FED). Non-uniformities of luminance characteristics in a FED are compensated pixel by pixel. This is done by storing a matrix of correction values, one value for each pixel. These correction values are determined by a previously measured emission efficiency of the corresponding pixels. These correction values are used for correcting the level of the signal that drives the corresponding pixel.

It is a disadvantage of the method described in EP 0755042 that a linear approach is applied, i.e. that a same correction value is applied to a drive signal of a given pixel, independent of whether a high or a low luminance has to be provided. However, pixel luminance for different drive signals of a pixel depends on physical features of the pixel, and those physical features may not be the same for high or low luminance levels. Therefore, pixel non-uniformity is different at high or low levels of luminance, and if corrected by applying to a pixel drive signal a same correction value independent of the drive value corresponds to a high or to a low luminance level, non-uniformities in the luminance are still observed.

SUMMARY

A method of image processing according to one embodiment includes, for each of a plurality of pixels of a display, obtaining a measure of a light-output response of at least a portion of the pixel at each of a plurality of driving levels. The method includes modifying a map that is based on the obtained measures, to increase a visibility of a characteristic of a displayed image during a use of the display. The method also includes obtaining a display signal based on the modified map and an image signal.

An image processing apparatus according to an embodiment includes an array of storage elements configured to store, for each of a plurality of pixels of a display, a measure of a light-output response of at least a portion of the pixel at each of a plurality of driving levels. The apparatus also includes an array of logic elements configured to modify a map based on the stored measures and to obtain a display signal based on the modified map and an image signal. The array of logic elements is configured to modify the map to increase a visibility of a characteristic of a displayed image during a use of the display.

The scope of disclosed embodiments also includes a system for characterizing the luminance response of each individual pixel of a matrix display, and using this characterization to pre-correct the driving signals to that display in order to compensate for the expected (characterized) unequal luminance between different pixels.

These and other characteristics, features and potential advantages of various disclosed embodiments will become apparent from the following detailed description, taken in conjunction with the accompanying drawings, which illustrate, by way of example, principles of the invention. This description is given for the sake of example only, without limiting the scope of the invention. The reference figures quoted below refer to the attached drawings.

BRIEF DESCRIPTION OF THE DRAWINGS

FIGS. 13-20 show examples of neighborhoods of a pixel or subpixel.

Figure 1:
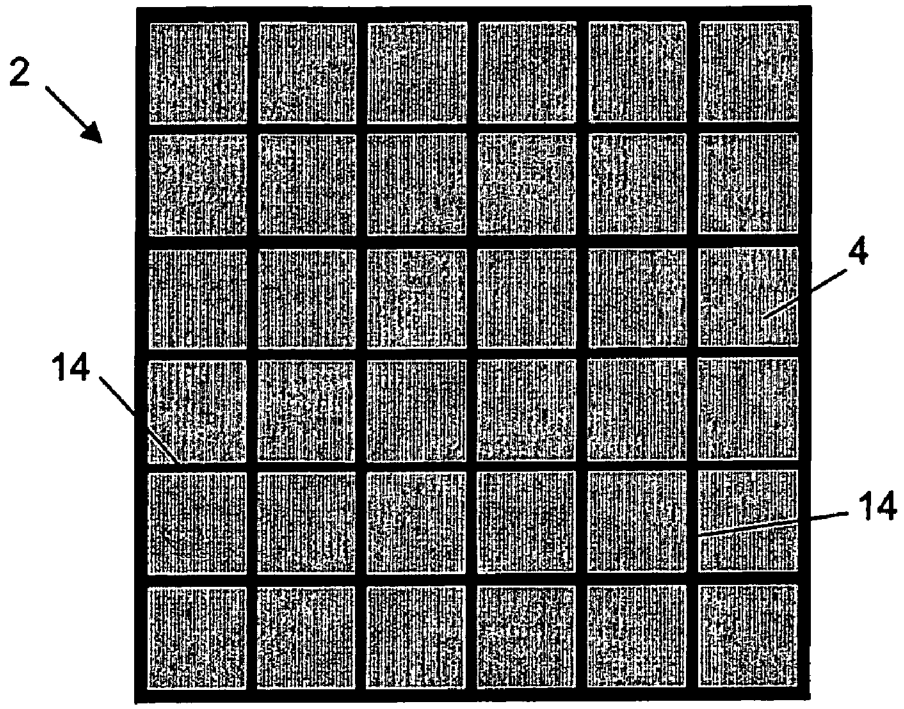
FIG. 1 illustrates a matrix display having greyscale pixels with equal luminance.

In the different figures, the same reference figures refer to the same or analogous elements.

DETAILED DESCRIPTION

The scope of disclosed embodiments includes a system and a method for noise reduction in medical imaging, in particular for medical images being viewed on display systems. At least some embodiments may be applied to overcome one or more disadvantages of the prior art as mentioned above.

Various embodiments will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Unless expressly limited by its context, the term "obtaining" is used to indicate any of its ordinary meanings, such as sensing, measuring, recording, receiving (e.g. from a sensor or external device), and retrieving (e.g. from a storage element).

In the present description, the terms "horizontal" and "vertical" are used to provide a co-ordinate system and for ease of explanation only. They do not need to, but may, refer to an actual physical direction of the device.

Embodiments relate to a system and method for noise reduction, for example in real-time, in medical imaging and in particular of the non-uniformity of pixel luminance behavior present in matrix addressed electronic display devices such as plasma displays, liquid crystal displays, LED and OLED displays used in projection or direct viewing concepts.

Embodiments may be applied to emissive, transmissive, reflective and trans-reflective display technologies fulfilling the feature that each pixel is individually addressable.

A matrix addressed display comprises individual display elements. In the present description, the term "display elements" is to be understood to comprise any form of element which emits light or through which light is passed or from which light is reflected. A display element may therefore be an individually addressable element of an emissive, transmissive, reflective or trans-reflective display. Display elements may be pixels, e.g. in a greyscale LCD, as well as sub-pixels, a plurality of sub-pixels forming one pixel. For example three sub-pixels with a different color, such as a red sub-pixel, a green sub-pixel and a blue sub-pixel may together form one pixel in a color LCD. A subpixel arrangement may also be used in a greyscale (or "monochrome") display. Whenever the word "pixel" is used, it is to be understood that the same may hold for sub-pixels, unless the contrary is explicitly mentioned.

Embodiments will be described with reference to flat panel displays but the range of embodiments is not limited thereto. It is understood that a flat panel display does not have to be exactly flat but includes shaped or bent panels. A flat panel display differs from a display such as a cathode ray tube in that it comprises a matrix or array of "cells" or "pixels" each producing or controlling light over a small area. Arrays of this kind are called fixed format arrays. There is a relationship between the pixel of an image to be displayed and a cell of the display. Usually this is a one-to-one relationship. Each cell may be addressed and driven separately.

The range of embodiments includes embodiments that may be applied to flat panel displays that are active matrix devices, embodiments that may be applied to flat panel displays that are passive matrix devices, and embodiments that may be applied to both types of matrix device. The array of cells is usually in rows and columns but the range of embodiments includes applications to any arrangement, e.g. polar or hexagonal. Although embodiments will mainly be described with respect to liquid crystal displays, the range of application of the principles disclosed herein is more widely applicable to flat panel displays of different types, such as plasma displays, field emission displays, electroluminescent (EL) displays, organic light-emitting diode (OLED) displays, polymeric light-emitting diode (PLED) displays, etc. In particular, the range of embodiments includes application not only to displays having an array of light emitting elements but also to displays having arrays of light emitting devices, whereby each device is made up of a number of individual elements. The displays may be emissive, transmissive, reflective, or trans-reflective displays, and the light-output behavior may be caused by any optical process affecting visual light or electrical process indirectly defining an optical response of the system.

Further the method of addressing and driving the pixel elements of an array is not considered a limitation on the application of these principles. Typically, each pixel element is addressed by means of wiring but other methods are known and are useful with appropriate embodiments, e.g. plasma discharge addressing (as disclosed in U.S. Pat. No. 6,089,739) or CRT addressing.

Figure 2:
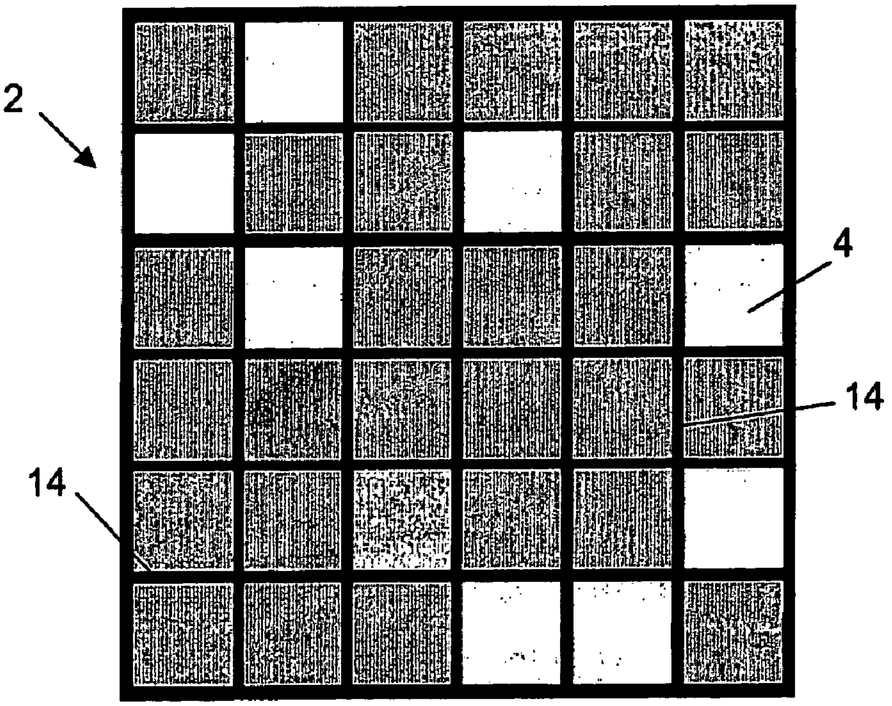
FIG. 2 illustrates a matrix display having greyscale pixels with unequal luminance.
Figure 3:
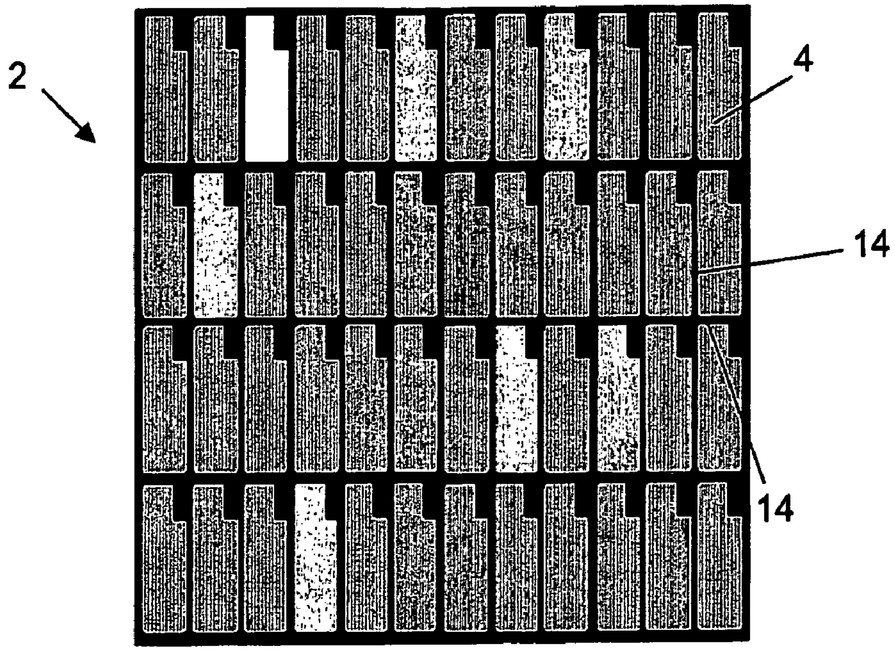
FIG. 3 illustrates a greyscale LCD based matrix display having unequal luminance in subpixels.

A matrix addressed display 2 comprises individual pixels. These pixels 4 can take all kinds of shapes, e.g. they can take the forms of characters. The examples of matrix displays 2 given in FIG. 1 to FIG. 3 have rectangular or square pixels 4 arranged in rows and columns. FIG. 1 illustrates an image of a perfect display 2 having equal luminance response in all pixels 4 when equally driven. Every pixel 4 driven with the same signal renders the same luminance. In contrast, FIG. 2 and FIG. 3 illustrate different cases where the pixels 4 of the displays 2 are also driven by equal signals but where the pixels 4 render a different luminance, as can be seen by the different grey values in the different drawings. The spatial distribution of the luminance differences of the pixels 4 can be arbitrary. It is also found that with many technologies, this distribution changes as a function of the applied drive to the pixels. For a low drive signal leading to low luminance, the spatial distribution pattern can differ from the pattern at a higher driving signal.

The phenomenon of non-uniform light-output response of a plurality of pixels is disturbing in applications where image fidelity is required to be high, such as for example in medical applications, where luminance differences of about 1% may have a clinical significance. The unequal light-output response of the pixels superimposes an additional, disturbing and unwanted random image on the required or desired image, thus reducing the signal-to-noise ratio (SNR) of the resulting image.

Moreover, at the end the only goal is to increase the accuracy and quality of the medical diagnosis, and noise reduction is a means to accomplish this goal. Therefore, noise reduction does not necessarily have the same meaning as correction for non-uniformities. In other words, if the non-uniformities do not interfere with the medical diagnosis then there is no advantage to correct for the non-uniformities. In some cases correcting those non-uniformities can even result in lower accuracy of diagnosis as will be explained in detail later in this text. This also means that the noise reduction algorithms in the ideal case are matched with the type of medical image being looked at, as will be explained later.

In order to be able to correct matrix display pixel non-uniformities, it is desirable that the light-output of each individual pixel is known, and thus has been detected.

The range of embodiments includes a characterizing device such as a vision measurement system, a set-up for automated, electronic vision of the individual pixels of the matrix addressed display, i.e. for measuring the light-output, e.g. luminance, emitted or reflected (depending on the type of display) by individual pixels 4, using a vision measurement set-up. The vision measurement system comprises an image capturing device 6, 12 and possibly a movement device 5 for moving the image capturing device 6, 12 and/or the display 2 with respect to each other. Two embodiments are given as an example, although other electronic vision implementations may be possible reaching the same result: an electronic image of the pixels.

Figure 4:
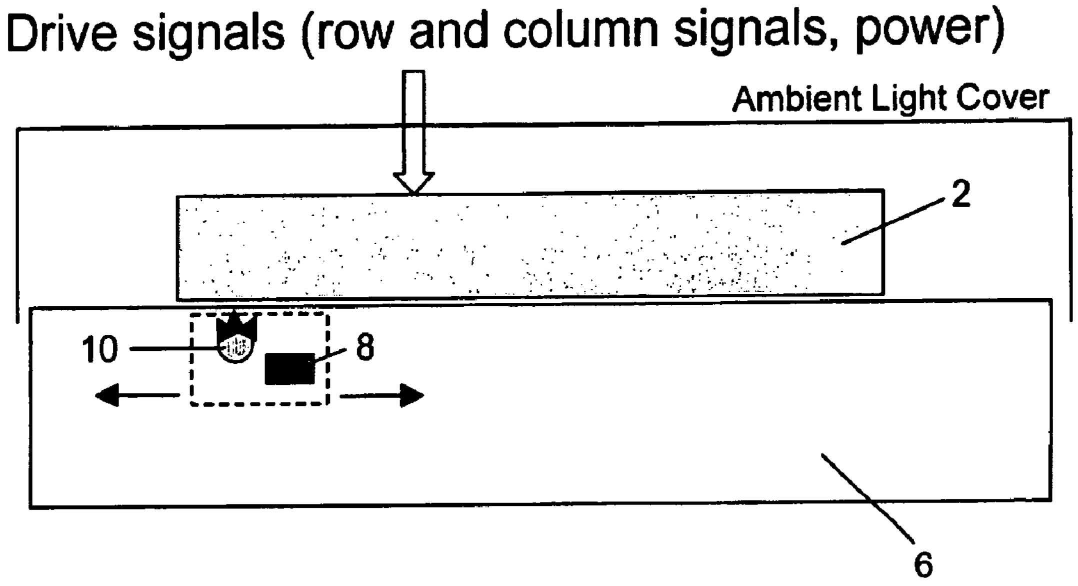
FIG. 4 illustrates a first embodiment of an image capturing device, the image capturing device comprising a flatbed scanner.

According to a first embodiment, as represented in FIG. 4, the matrix addressed display 2 is placed with its light emitting side against an image capturing device, for example is placed face down on a flat bed scanner 6. The flat bed scanner 6 may be a suitably modified document or film scanner. The spatial resolution of the scanner 6 is so as to allow for adequate vision of the individual pixels 4 of the display 2 under test. The sensor 8 and image processing hardware of the flat bed scanner 6 also have enough luminance sensitivity and resolution in order to give a precise quantization of the luminance emitted by the pixels 4. For an emissive display 2, the light source 10 or lamp of the scanner 6 is switched off: the luminance measured is emitted by the display 2 itself. For a reflective type of display 2, the light source 10 or lamp of the scanner 6 is switched on: the light emitted by the display 2 is light from the scanner's light source 10, modulated by the reflective properties of the display 2, and reflected, and is subsequently measured by the sensor 8 of the scanner 6.

The output file of the image capturing device (in the embodiment described, scanner 6) is an electronic image file giving a detailed picture of the pixels 4 of the complete electronic display 2.

Figure 5:
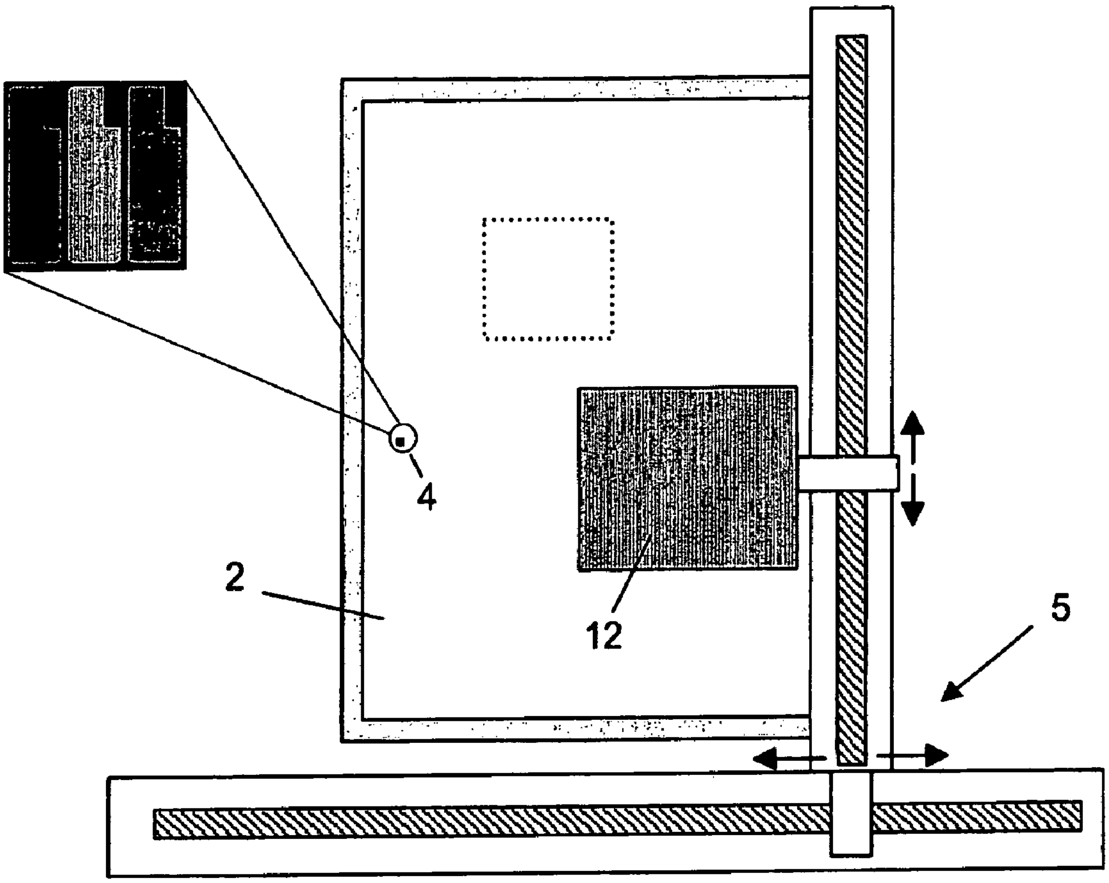
FIG. 5 illustrates a second embodiment of an image capturing device, the image capturing device comprising a CCD camera and a movement device.

According to a second embodiment of the vision measurement system, as illustrated in FIG. 5, an image capturing device, such as e.g. a high resolution CCD camera 12, is used to take a picture of the pixels 4 of the display 2. The resolution of the CCD camera 12 is so as to allow adequate definition of the individual pixels 4 of the display 2 to be characterized. A typical LCD panel may have a diagonal dimension of from 12 or 14 to 19 or 21 inches or more. In the current state of the art of CCD cameras, it may not be possible to image large matrix displays 2 at once. As an example, high resolution electronic displays 2 with an image diagonal of more than 20" may require that the CCD camera 12 and the display 2 are moved with respect to each other, e.g. the CCD camera 12 is scanned (in X-Y position) over the image surface of the display 2, or vice versa: the display 2 is scanned over the sensor area of the CCD camera 12, in order to take several pictures of different parts of the display area 2. The pictures obtained in this way are thereafter preferably stitched to obtain one image of the complete active image surface of the display 2.

Again, the resulting electronic image file, i.e. the output file of the image capturing device, which is in the embodiment described a CCD camera 12, gives a detailed picture of the pixels 1 of the display 2 that needs to be characterized. An example of an image 13 of the pixels 4 of a matrix display 2 is visualized in FIG. 6*a*.

Once an image 13 of the pixels 4 of the display 2 has been obtained, a process is run to extract pixel characterization data from the electronic image 13 obtained from the image capturing device 6, 12.

In the image 13 obtained, algorithms will be used to assign one luminance value to each pixel 4. One embodiment of such an algorithm includes two tasks. In a first task, the actual location of the matrix display pixels 4 is identified and related to the pixels of the electronic image, for example of the CCD or scanner image.

Figures 6, 6A, 6B, 6C:
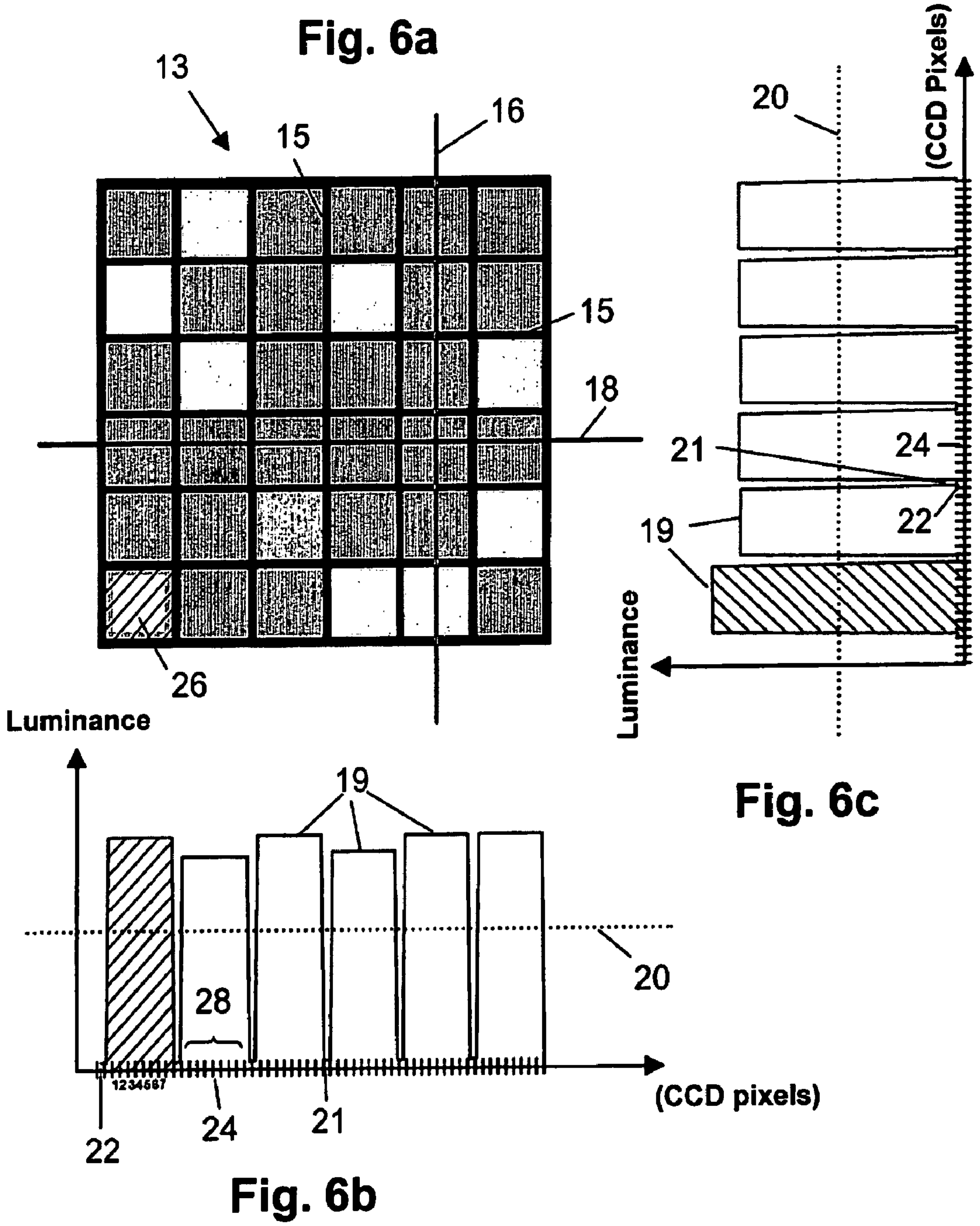
FIG. 6 schematically illustrates an embodiment of an algorithm to identify matrix display pixel locations.

In matrix displays 2, individual pixels 4 can be separated by a black matrix raster 14 that does not emit light. Therefore, in the image 13, a black raster 15 can be distinguished. This characteristic can be used in the algorithms to clearly separate and distinguish the matrix display pixels 4. The luminance distribution on an imaginary line in a first direction, e.g. vertical line 16 in a Y-direction, and across an imaginary line in a second direction, e.g. horizontal line 18 in an X-direction, through a pixel 4 can be extracted using imaging software, as illustrated in FIG. 6*a* to FIG. 6*c*. Methods of extracting features from images are well known, e.g. as described in "Intelligent Vision Systems for Industry", B. G. Batchelor and P. F. Whelan, Springer-Verlag, 1997, "Traitement de l'Image sur Micro-ordinateur", Toumazet, Sybex Press, 1987; "Computer vision", Reinhard Klette and Karsten Schlüns, Springer Singapore, 1998; "Image processing: analysis and machine vision", Milan Sonka, Vaclaw Hlavac and Roger Boyle, 1998.

Supposing that the image generated by the matrix display 2 when the image was acquired by the image capturing device 6, 12 was set on all pixels 4 having a first value, e.g. all white pixels 4 or all pixels 4 fully on. Then the luminance distribution across vertical line 16 and horizontal line 18, in the image 13 acquired by the image capturing device 6, 12, shows peaks 19 and valleys 21, that correspond with the actual location of the matrix display pixels 4, as shown in FIG. 6*b* and FIG. 6*c* respectively. As noted before, the spatial resolution of the image capturing device, e.g. the scanner 6 or the CCD camera 12, needs to be high enough, i.e. higher than the resolution of the matrix display 2, e.g. ten times higher than the resolution of the matrix display 2 (10× over-sampling). Because of the over-sampling, it will be possible to express the horizontal and vertical distance of the matrix display pixels 4 precisely in units of pixels of the image capturing device 6, 12 (not necessarily integer numbers).

A threshold luminance level 20 is constructed that is located at a suitable value between the maximum luminance level measured at the peaks 19 and minimum luminance level measured at the valleys 21 across the vertical lines 16 and the horizontal lines 18, e.g. approximately in the middle. All pixels of the image capturing device 6, 12 with luminance below the threshold level 20 indicate the location of the black raster 15 in the image, and thus of a corresponding black matrix raster 14 in the display 2. These locations are called in the present description "black matrix locations" 22. The most robust algorithm will consider a pixel location of the image capturing device 6, 12 which is located in the middle between two black matrix locations 22 as the center of a matrix display pixel 4. Such locations are called "matrix pixel center locations" 24. Depending on the amount of over-sampling, an amount of image capturing device pixels located around the matrix pixel center locations 24 across vertical line 16 and horizontal line 18, can be expected to represent the luminance of one matrix display pixel 4. In FIG. 6*a*, these image capturing device pixels, e.g. CCD pixels, are located in the hatched area 26 and are indicated with numbers 1 to 7 in FIG. 6*b*. These CCD pixels are called "matrix pixel locators" 28 in the following. The matrix pixel locators 28 are defined for one luminance level of the acquired image 13. To make the influence of noise minimal, the luminance level is preferably maximized (white flat field when acquiring the image).

Other algorithms to determine the exact location of the matrix display pixels 4 are included within the scope of the present invention. By means of example a second embodiment, which describes an alternative using markers, is discussed below.

A limited number of marker pixels (i.e. matrix display pixels 4 with a driving signal which is different from the driving signal of the other matrix pixels 4 of which an electronic image is being taken), for instance four, is used to allow precise localization of the matrix display pixels 4. For example, four matrix display pixels 4 ordered in a rectangular shape can be driven with a higher driving level than the other matrix display pixels 4. When taking an electronic image 13 of this display area, it is easy to determine precisely the location of those four marker pixels 4 in the electronic image 13. This can be done for instance by finding the four areas in the electronic image 13 that have the highest local luminance value. The centre of each marker pixel can then be defined as the centre of the local area with higher luminance. Once those four marker pixels have been determined, interpolation can be used to determine the location of the other matrix display pixels present in the electronic image. This can be done easily since the location of the other matrix display pixels is known relative to the marker pixels a priori (defined by the matrix display pixel structure). Note that more advanced techniques can be used (for instance, correction for lens distortion, e.g. of the imaging device) to calculate an exact location of the pixels relative to each other. Other test images or patterns may also be used to drive the display under test during characterization.

A potential advantage of this algorithm compared to one according to the previous embodiment is that a lower degree of over-sampling may be sufficient. For example, such an algorithm may be implemented without including a task of isolating the black matrix in the electronic image. Therefore, lower resolution image capturing devices 6, 12 can be used. The algorithm can also be used for matrix displays where no black matrix structure is present or for matrix displays that also have black matrix between sub-pixels or parts of sub-pixels, such as a color pixel for example.

Instead of (or in addition to) luminance, also color can be measured. The vision set-up may then be slightly different, to comprise a color measurement device, such as a colorimetric camera or a scanning spectrograph for example. The underlying principle, however, is the same: a location of a pixel and its color are determined.

In a second task of the algorithm to assign one light-output value to each pixel 4, after having determined the location of each individual matrix pixel 4, its light-output is calculated.

This is explained for a luminance measurement. The luminance of the matrix pixel locators 28 across the X-direction and Y-direction that describe one pixel location, are averaged to one luminance value using a suitable calculation method, e.g. the standard formula for calculation of a mean. As a result, every pixel 4 of the matrix display 2 that is to be characterized is assigned a pixel value (a representative or averaged luminance value). Other more complex formulae are included within the scope of the present invention: e.g. harmonic mean can be used, or a number of pixel values from the image 13 can be rejected from the mean formula as outliers or noisy image capturing device pixels. Thus the measured values may be filtered to remove noise of the imaging device. A similar method may be applied for assigning a color value to each individual matrix pixel.

Note that it is also possible to use techniques known as "super-resolution" to create a high-resolution image of the display surface (and display pixels) with a lower-resolution capture device. This technique combines multiple lower-resolution images to generate a higher-resolution resulting image. In some implementations the super-resolution technique makes use of the fact that the object being imaged is slightly vibrating so that the relative orientation between object to be imaged and capture device is changing. In other implementations this vibration is actually enforced by means of mechanical devices. Also note that techniques exist to avoid problems with moiré effects and this by combining images of the object to be imaged that are slightly shifted relative to each other. Such a technique may be implemented to allow the use of one or more lower-resolution imaging devices without the risk of having problems with moiré effects.

It will be well understood by people skilled in the art that the light-output values, i.e. luminance values and/or color values, of the individual pixels 4 can be calculated in any of the described ways or any other way for various test images or light-outputs, i.e. for a plurality of test images in which the pixels are driven by different driving levels. Supposing that, in order to obtain a test image, all pixels are driven with the same information, i.e. with the same drive signal or the same driving level, then the displayed image represents a flat field with light-output of the pixels ranging from 0% to 100% (e.g. black to white) depending on the drive signal. For each percentage of drive between 0% (zero drive, black field) and 100% (full drive or white field) a complete image 13 of the matrix display 2 under test can be acquired, and the light-output of each individual pixel 4 can be calculated from the acquired image 13 with any of the described algorithms or any other suitable algorithm. If all response points (video level or luminance level) of a given pixel i are then grouped, then the light-output response function of that given pixel i is obtained.

Figure 7:
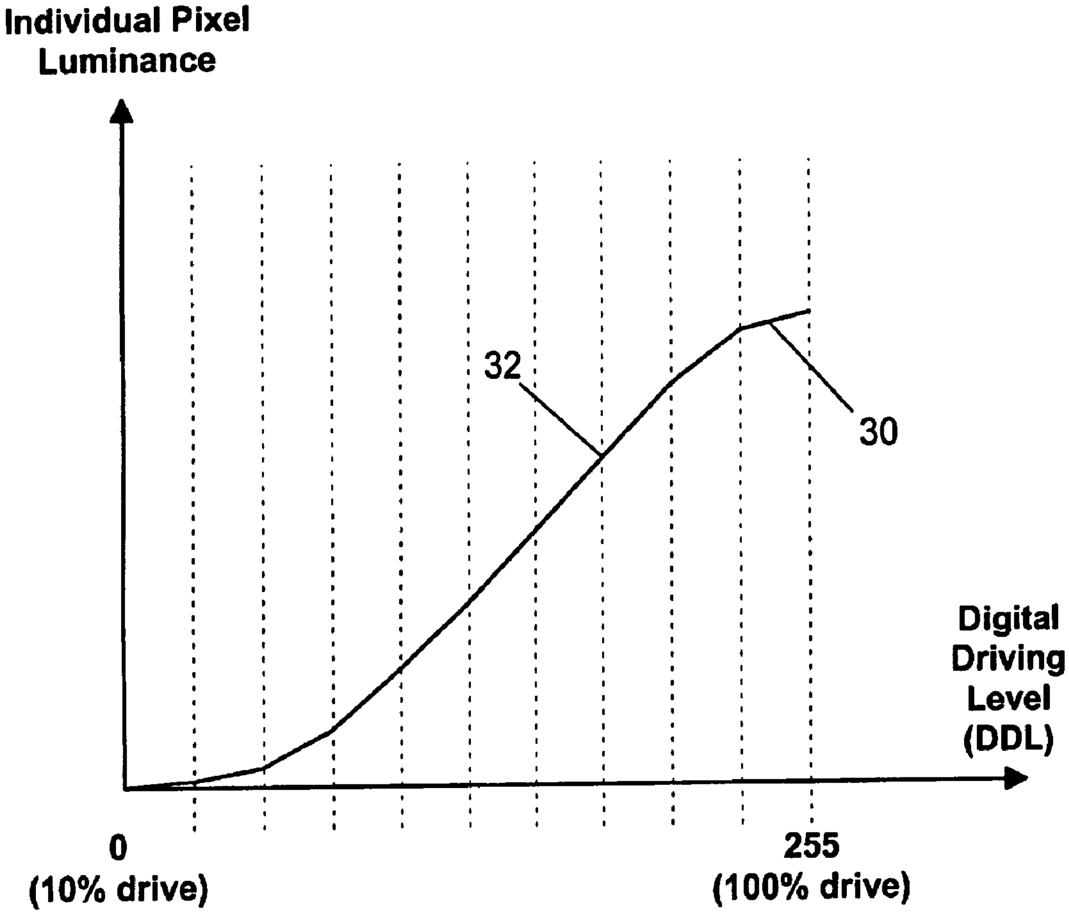
FIG. 7 shows an example of a luminance response curve of an individual pixel, the curve being constructed using eleven characterization points.

The response function may be represented by a number of suitable means for storage and retrieval, e.g. in the form of an analytical function, in the form of a look-up table or in the form of a curve. An example of such a luminance response curve 30 is illustrated in FIG. 7. The luminance response function can be constructed with as many points as desired or required. The curve 30 in the example of FIG. 7 is constructed using eleven characterization points 32, which result from the display and acquisition of images, and the calculation of luminance levels for a given pixel 4. Interpolation between those characterization points 32 can then be carried out in order to obtain a light-output response of a pixel 4 corresponding to a driving level which is different from that of any of the characterization points 32. Different interpolation methods exist, and are within the skills of a person skilled in the art.

It is to be remarked that a light-output response function is thus available for every individual pixel 4 of the matrix display 2 to be characterized. The light-output response functions of individual pixels 4 may all be different or the response functions may be reduced to a smaller number of typical or representative functions, and each pixel may be assigned to one of these typical functions.

Note that it is recommended that an infrared blocking filter is added to the capture device in order to be able to do accurate measurements especially at the lower video levels. This is because LCD displays often have significant IR component in the lower video levels (ideally a filter should be used that matches the response of the human eye, and for color multiple filters so that red, green and blue components can be accurately measured without crosstalk).

For modern color liquid crystal displays (LCDs) with a resolution up to three million pixels, each pixel may be composed of a number of color sub-pixels such as red, green and blue sub-pixels, and sometimes even more (e.g. an RGBW array). Thus nine million or more functions may be obtained, each defined by a set of e.g. sixteen values (light-output in function of drive level).

A pixel's response function is the result of various physical processes, each of which may define the luminance generation process to a certain extent. A few of the processes and parameters that influence an individual pixel's light-output response and can cause the response to be different from pixel to pixel are set forth in the following non-exhaustive list:

- the cell gap (in case of LCD displays),
- the driver integrated circuit (IC),
- electronic circuitry preceding the driver IC,
- LCD material alignment defined by rubbing,
- the backlight intensity (drive voltage or current),
- temperature,
- spatial (e.g. over the area of the display 2) non-uniformity of any of the above mentioned parameters or processes.

The light-output response of the individual pixels 4 may be assumed to completely describe that pixel's light-output behavior as a function of the applied drive signal. This behavior is individual and may differ from pixel to pixel.

A next task of an algorithm according to an embodiment defines a drive function, e.g. a drive curve, which ensures that a predefined light-output response (from electrical input signal to light-output output of the pixel) can be established. The overall light-output response functions can be arbitrary, or may follow a required mathematical law, such as a gamma law, a linear curve or a DICOM (Digital Imaging and Communications in Medicine) curve, the choice being defined by the application or type of images to be rendered (medical images, graphics art images, video editing, etc.). Thus this next task of the algorithm provides a correction principle to generate a required light-output response curve for an individual pixel 4, and thus to equalize the response of all pixels 4 in a display 2 or selected portion thereof.

Figure 8:
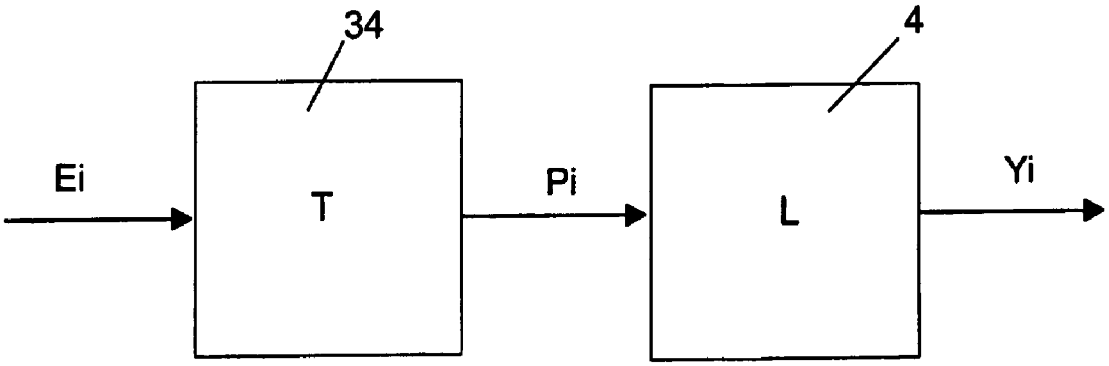
FIG. 8 is a block-schematic diagram of signal transformation according to an embodiment.

Reference is made to FIG. 8. A display pixel 4 is represented as a black box with an electrical input Pi and an optical output Yi. Display pixel 4 has a light-output response function represented by a transfer function L, there being one light-output response function and thus one transfer function L for every individual pixel 4 (e.g. pixels that can be driven independently from other pixels) in the display 2.

This display pixel 4 is preceded by a transformation circuit 34 that transforms an electrical drive signal Ei into an electrical signal Pi. Note that the present invention is not limited to electrical drive signals, e.g. transformation from optical signals to optical signals or from any information carrier to any information carrier are also possible. The transformation of the electrical drive signal Ei into an electrical signal Pi, carried out by the transformation circuit 34, may be different for every pixel 4 and depends on the light-output response function L of that pixel 4. Whether the transformation circuit 34 is transforming digital or analog signals, is not a limitation to the contemplated range of embodiments or applications of the invention.

One straightforward way to realize this transformation circuit 34 is a digital look-up table as will be shown further. In this case, the counter i (as an index of the electrical drive signals Ei, the electrical signal Pi and the light-output signal, e.g. luminance signal Yi) ranges from 1 to the maximum number of individual digital driving levels that can be generated by circuitry driving the pixel. In case of 8-bit resolution, 256 discrete levels are possible.

The drive signals Ei and Pi can be expressed using any physical quantity giving a relationship with the intensity of the drive applied to the display element. This is technology dependent: it is voltage in case of LCD, and current in case of LED displays. As a generic representation of said physical quantity, digital driving level (DDL) may be used, which is proportional to current or voltage drive and is defined by a digital-to-analog conversion process.

The transformation circuit has a transfer function T, which may be different for every pixel. Its purpose is to transform the electrical signal Ei in such a way to a signal Pi so that a predefined and identical overall light-output, e.g. luminance response Yi versus Ei (further noted as Yi/Ei) is generated for every individual pixel 4, even if the light-output response curves, e.g. luminance response curves Li of these pixels 4 differ. Hereinafter, as an example only, luminance correction is explained.

Figure 9:
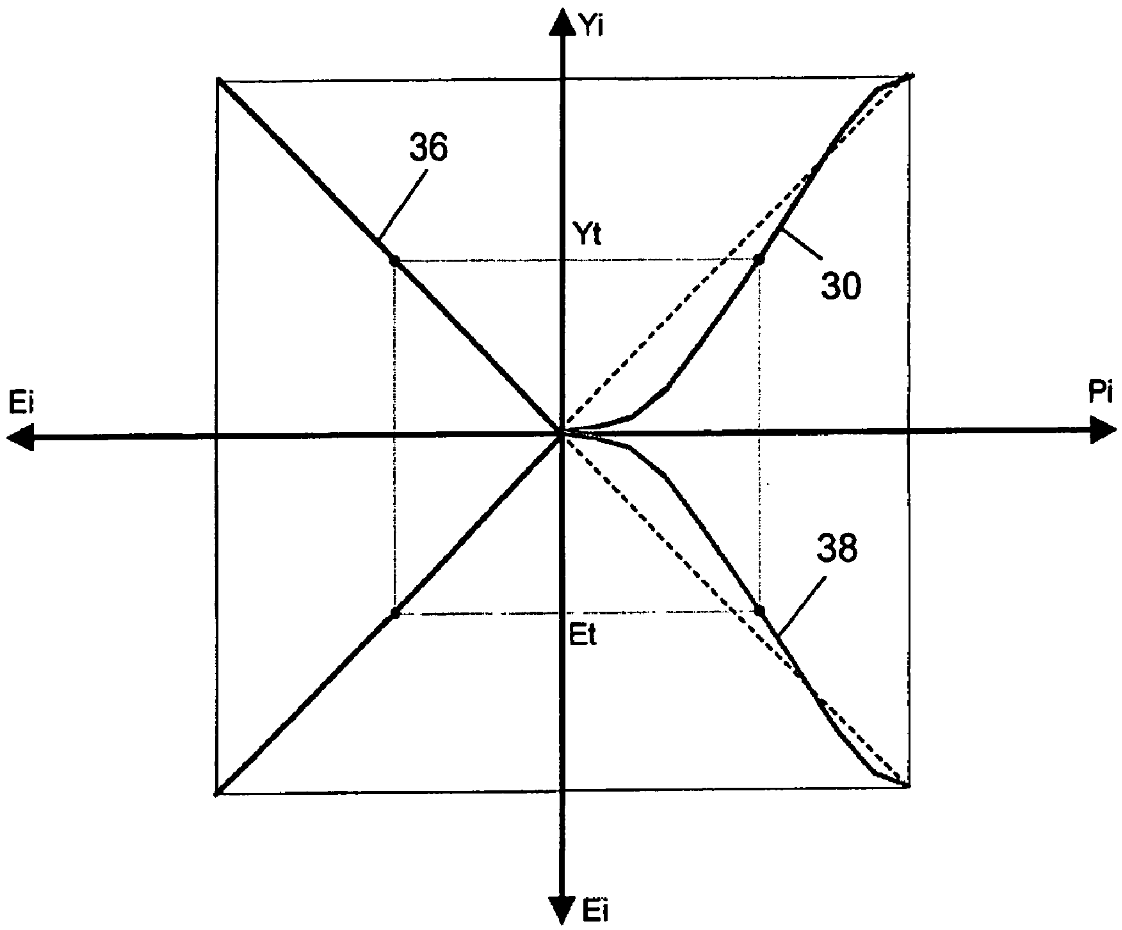
FIG. 9 illustrates the signal transformation of the diagram of FIG. 8.

The signal transformation process of the signal path in FIG. 8 is graphically illustrated in FIG. 9.

The luminance response function L of an individual pixel 4 is an S-shaped curve 30 in this example, although other types of characteristic curve can be obtained from the characterization process step as described above, depending e.g. upon the materials used and the type of display. In the example of FIG. 9, the desired overall response for the complete circuit Yi versus Ei is a linear curve 36. Therefore, as can be seen in FIG. 9, it may be desired for the transfer function T to have particular characteristics, i.e. it may for example be a curve 38 of a particular shape. A transfer curve 38 is obtained by mirroring the pixel characteristic curve 30 around a linear curve with slope 1. The response function T for a particular pixel 4, complementary to the luminance response L of that particular pixel 4, yields an overall response Yi/Ei which is linear. As remarked before, it is possible to adapt the transfer function T in such a way as to yield other shapes for the overall response Yi/Ei.

Figure 10:
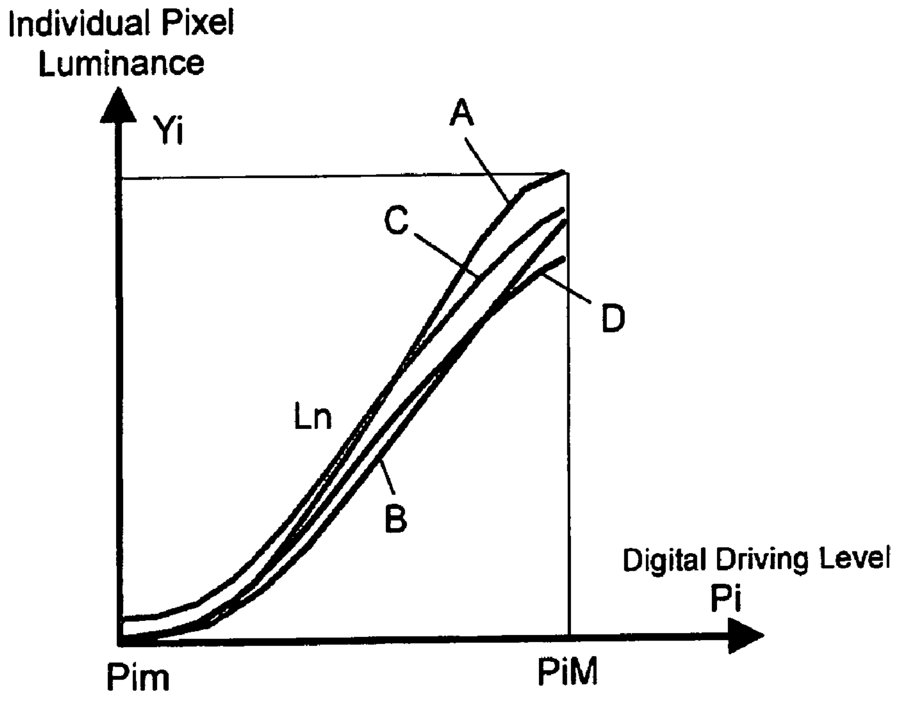
FIG. 10 is a graph showing different examples of pixel response curves.

Pixels 4 of the same electronic display 2 may show a different response behavior, leading to a different characteristic luminance response function L. The transfer curves L of the individual pixels 4 can differ to a great extent. Due to the effects described above, pixels 4 can show a basically different response behavior L. Some examples of different luminance response curves are shown in FIG. 10 as measured on real displays. Some pixels 40 may exhibit a lower luminance at maximum drive level, as illustrated by curves B and D in FIG. 10. Some other pixels may exhibit higher luminance than other pixels at low drive levels, as illustrated by curve C in FIG. 10. In some cases, the light-outputs/drive signals relationships represented by two different pixels may cross over within the maximum and minimum brightness of the display, i.e. at certain drive levels the light-output response of a first pixel is higher than the light-output response of a second pixel, while at other drive levels the light-output response of the second pixel is higher than the light-output response of the first pixel.

Using techniques and signal processing as described e.g. in FIG. 9, it is possible to equalize the overall behavior of all individual pixels 4, within the boundaries of the physical limitations defined by the maximum and minimum drive level of each pixel 4. More specifically, it may not be possible for such techniques alone to increase the light output Yi of a pixel 4 higher than the level reached at maximum drive PiM. Also, it may not be possible for such techniques alone to make a pixel 4 darker (decrease the luminance Yi any lower) than the level reached at minimum drive level Pim.

As an example, to equalize the behavior of the pixels with curves A, B and C in FIG. 10, each pixel could be made to show a behavior as indicated by the curve indicated with D. One way to reach that behavior with a pixel having an output response Yi as indicated by curve A would be to attenuate the output response Yi at PiM, while increasing the output response Yi at Pim. Note that it may not be necessary to equalize the behavior of all of the pixels, as one could choose to not fully equalize certain display pixels because of other (negative) effects. For example, not increasing the output response Yi at Pim may result in a higher contrast ratio. One could define a luminance interval that defines an area where all pixels are equalized perfectly. Outside that interval pixels with non-optimal correction might exist. Of course other reasons can result in deciding not to correct some pixels or not to correct some pixels in a well-defined luminance-interval.

A specific transfer curve Tn (with $1 \leqq n \leqq K$, with K being the number of individual pixels 4 of the display 2 or selected portion thereof or, alternatively, the number of different curves in a reduced set) matched for every pixel 4 may be used to compensate the behavior of every individual pixel's characteristic luminance response curve Ln. This signal conversion principle, when applied individually to every such pixel 4, allows equalization of the overall response Yi/Ei for all pixels. In this way, any unequal luminance behavior over the display area, as described above, may be cured or modified.

The same principle can be used to equalize the color behavior of a display or screen. In case of color displays, the screen comprises pixels each having various sub-pixels, e.g. red (R), green (G) and blue (B) sub-pixels. According to an embodiment, the sub-pixels of a color display may be characterized, and the required color of the pixel (i.e. luminance of the individual color sub-pixels) may be calculated such that a uniform color behavior of all pixels over the complete screen area is obtained.

In this case it may not be necessary for the response curve of each color element to be exactly the same as any other of the same function. Humans experience color in such a way that spectral differences, if small enough, are not perceived. The degree of mismatch of colors has been investigated thoroughly and areas of the CIE chromaticity diagram which appear the same color to most subjects are described as color ovals or MacAdam ellipses (see for example, "Display Interfaces", R. L. Myers, Wiley, 2002). Thus, a pixel may be within color specification even when one or more of its sub-pixel elements has a deviant luminosity output response, provided that the light output of the complete pixel structure compared to the specified output differs by an amount which lies within a relevant tolerance, such as within the relevant MacAdam ellipse for the color to be displayed. In this case there is no noticeable color shift. The degree of color shift may be measured in "just noticeable differences", JND or "minimum perceptible color differences", MPCD.

To provide a measure of the color shift, the light outputs of all the sub-pixel elements may be combined with their spectral response according to an equation such as:

$$\Delta E^*_{uv} = \sqrt{(L^*_1 - L^*_2)^2 + (u^*_1 - u^*_2)^2 + (v^*_1 - v^*_2)^2}$$

where the color output of the pixel is $L_1^*$, $u_1^*$, $v_1^*$ in L*u*v* space and the required color is $L_2^*$, $u_2^*$, $v_2^*$. For derivation and application of this equation, see the book by Myers mentioned above. Provided this error figure is small enough, then small deviations in the color output go unnoticed. This means that there is a certain tolerance on differences in luminosity relationships of sub-pixel elements which still provide an apparently uniform display. Therefore an optimization of a color display according to one embodiment includes capturing the luminosity and/or color output of all the pixels and/or pixel elements and optimizing the drive characteristics so that all pixels (or a selected number of such pixels, the others being defective pixels) have a luminosity and color range within the acceptable limits as defined by the above equation.

A similar technique can also be used to realize a desired non-uniformity of the screen with respect to its light-output (i.e. color and/or luminance) behavior. Instead of realizing a flat, spatially uniform behavior of the light-output, it can be the object of the matrix display to realize a non-uniform spatial behavior that corresponds to a target spatial function. As an example, certain visualization systems may include post-processing of the image displayed by the matrix display element, e.g. optical post-processing, which introduces spatial non-uniformities. Examples of such systems are for example, but not limited thereto, projection systems and tiled display systems using magnification lenses. The techniques disclosed herein can be used to introduce a non-uniformity of the light-output behavior to pre-correct for the behavior of the post-processing system so as to realize a better uniform behavior of the image that is produced as the result of the combination of said matrix display and said optical post-processing system.

In particular, the scope of disclosed embodiments includes configurations in which certain pixels are defined as defect pixels, i.e. that certain pixels are deliberately allowed to provide sub-optimal luminosity rather than reduce the brightness of the rest of the display in order to bring the operation of the remaining pixels within the range of the sub-optimal pixels. Such defect pixels may be dealt with in accordance with a method or device as described in U.S. patent application Ser. No. 10/719,881, entitled “Method and device for avoiding image misinterpretation due to defective pixels in a matrix display”. Thus embodiments may include at least two user-defined states: a maximum brightness display in which some of the pixels perform less than optimally but the remaining pixels are all optimized so that each pixel element operates within the same luminance range as other pixel elements having the same function, e.g. all blue pixel elements.

Storing a large amount of data as suggested above (i.e. one luminance response function for every individual pixel 4) is technologically possible, but may not be a cost-effective way. Accordingly, the range of embodiments includes a method to classify a pixel’s luminance response and thus reduce the data required for correction implementations. For example, the characterization data may be classified into a predetermined number N of categories, where N is greater than one and less than the number of pixels, with the characterization data of at least two pixels being assigned to one of the categories.

As explained above, every pixel 4 has its own characteristic luminance response. It is possible to characterize the luminance response function, and hence the required correction function for a pixel 4, into a set of parameters. More specifically, it may be desired to map the behavior of a pixel 4, although possibly different for each individual pixel 4, into categories that describe the required correction for a set of pixels. In that sense, various similarly behaving pixels can be categorized as suitable for using the same correction curve.

A potential advantage of this technique is to obtain a reduction of the data volume and associated storage memory that may be needed to realize the correction in hardware circuitry. As an example, a one-megapixel display 2 would have for each pixel one characteristic luminance response, which can be stored under the form of e.g. a LUT. This means that one million LUTs may need to be stored, in the absence of a reduction as described herein.

It may be an objective to define every possible correction curve for this display using a value which does not need to be able to point to all of the one million LUTs, for example using only an 8-bit value. This means that maximally 256 different correction curves, thus 256 categories, are available for correction of the one million pixels 4 of the display 2. The objective of the technique of data reduction is to find similarly behaving pixels 4 that can be corrected with one and the same correction curve, so that an 8-bit value for each pixel (and the 256 (correction) curves) suffices for correction of the complete display. It is to be remarked that the technique of data reduction may be applied on the pixel characteristic curve itself, or on the correction curve that is associated with this pixel, since the latter is derived from the former.

Another possibility is storing an additional correction value for each pixel next to the category to which the pixel belongs. In one example, an offset value is stored, which technique may be used to avoid storage of many characteristic curves that only differ in an offset value. Of course also other additional correction values can be stored (e.g. but not limited to gain, offset, shift, maximum).

An embodiment includes classifying the actual luminance response functions or curves found into a set of typical curves, based on closest resemblance of the actual curves with the typical curves. Different techniques exist that may be used to classify the pixel response functions or curves, or just curves in general, ranging from minimized least squares approaches, over k-means square approaches and harmonic mean square approaches, to neural network and Hopfield net based techniques. The type of technique used is not generally a limitation of the invention except as may be claimed below, but the fact that data reduction techniques are used to select a typical correction curve is an aspect of some embodiments.

The end result is that e.g. for a set of more than a million pixels that make up a typical computer data display, the correction curves can be fully defined by a limited amount of data (e.g. an 8-bit value per pixel), reducing the required hardware (mainly memory) to implement the correction. This data set may be called the pixel profile map (PPM). For example, the 8-bit value may be a pointer to a set of 256 different types of different typical functions. These typical functions may e.g. be stored as curves (a set of data points), as look-up tables, or in any other suitable form, such as for example as polynomials or by describing each curve by a vector to its points, in a memory for later use.

A further embodiment does not use classification into typical curves to obtain the PPM. This method describes the actually found pixel characterization data (PCD) by means of a polynomial description of the form:

$$y=a+bx+cx^2+ \dots +zx^n.$$

Instead of storing the typical curves (as in a method as described above), the coefficients a, b, . . . , z will be stored for each pixel in this case. Dependent upon the desired precision, and the implementation method to be used (e.g. software versus hardware), an order of the polynomial form can be selected. To a first approximation, the PCD can for example be approximated by a linear curve defining just an offset (coefficient a) and gain (coefficient b) parameter. In that case, for every pixel, the coefficients a and b may be stored in memory for later use. The parameters can be quantified with various resolutions depending on the desired precision. Any combination of typical curves and polynomial description (or any other mathematical description method such as but not limited to sine or cosine series, etc.) is also possible.

The overall result of the pixel characterization and classification is that the PPM is obtained for every pixel 4 of the display device 2 under test (or selected portion of the display). It may be desirable to obtain the PPM offline (e.g. within the factory), and then to perform correction based on the PPM on-line (in real-time).

Based on the PPM, an embodiment provides a correction circuit to generate a required pixel response curve in real time.

The correction circuit will apply a specific transfer curve correction for each individual pixel 4, which application may be performed synchronously with a pixel clock. Hereinafter, different embodiments of implementation methods are provided as an illustration. The methods are not meant to be exhaustive.

In a first embodiment, the transfer curve correction is realized by means of a look-up table. The correction circuit provides a dynamic switching of the look-up table at the frequency of the pixel clock. Associated with every pixel-value is the information about its typical luminance response curve. Thus, at every pixel, the correct look-up table is pointed to, e.g. that look-up table containing the right correction function for that individual pixel.

In the first implementation example, the video memory 40 is 16 bits wide per color (e.g. a 48-bit-wide digital word to define a color pixel). It contains for every (sub)pixel the pixel-value itself (8-bit value) and another 8-bit value identifying the pixel's response curve. This latter value is the result of the characterization process of the pixel, followed by the classification process of the pixel's response curve. At read-out of the pixel value from the video memory 40 at the rhythm of the pixel clock, this pixel value is used as a pointer to a bank of different 8- to 8-bit look-up tables 42, actually representing 256 different correction classes available for this display's pixels. The principle of look-up tables is well known by persons skilled in the art and allows for a real-time implementation at the highest pixel clock speeds as found in today's display controllers.

A second embodiment can be based on the second classification method that stores the pixel correction curves by means of polynomial descriptors. In such a case, the required response will be calculated by a processing unit capable of calculating the required drive to the pixel based on the polynomial form:

$$y=a+bx+cx^2+\ldots+zx^n.$$

A processing unit will retrieve for every pixel the stored coefficients a, b, c, . . . , z and will calculate in real time or off-line the required drive y for the pixel, at a given value x defined by the actual pixel value.

For embodiments that include a correction task, a correction of the drive value to the pixels can be applied in real time using hardware or software methods, but it can also be carried out off-line (not in real time), e.g. by means of software. Software methods may be preferred where cost must be minimized or where dedicated hardware is not available or is to be avoided. Such software methods may be based upon a microprocessor, embedded microcontroller, or similar processing engine such as Programmable Logic Arrays (PLA), Programmable Array Logic (PAL), Gate Arrays especially Field Programmable Gate Arrays (FPGA) for executing methods as described herein. In particular, such processing engines may be embedded in dedicated circuitry such as a VLSI.

As an example of the latter case, the PPM of the complete display 2 can be made accessible by a software application. This application may be configured to process every individual pixel with a LUT correction as defined by the PPM data. In that way, the image will be pre-corrected according to the actual display characteristics, before it is generated by the imaging hardware.

It is to be understood that although preferred embodiments, specific constructions and configurations, as well as materials, have been discussed herein for devices according to the present invention, various changes or modifications in form and detail may be made without departing from the scope and spirit of this invention.

Above a basic algorithm for correction of non-uniformities was explained. In some applications, however, problems may exist that impair the usefulness of this basic version of the algorithm.

A first problem relates to pixel defects. Pixel defects are for instance defective pixels that are stuck in one state, such as the bright state or dark state. These defective pixels often are result of a short or open transistor. In some applications of the basic algorithm, pixel defects would just be treated as any other form of non-uniformity. However, this could result in making the defects even more visible instead of less visible.

Such a principle will now be explained: a typical medical monochrome display (such as the dual-domain five-mega-pixel monochrome medical LCD from International Display Technology Co., Ltd. (Yasu, Japan) has pixels where each pixel consists of three sub pixels. If one of those sub pixels is defective, for instance always dark, then this pixel (measured) as a unit will be perceived as being too dark when driven at values larger than zero. The result would be that a basic algorithm as described above could drive the pixel (meaning the two sub pixels that are still functioning normally) as to have higher luminance. However, doing this will further increase the contrast between the two normally functioning sub pixels in that pixel and the defective sub pixel in that pixel. The result will be that the defective sub pixel becomes much more visible than if no correction would have been applied. Note that the same principle is valid for other pixel organizations and if more than one sub pixel inside one LCD pixel is defective. Also the defective sub pixel(s) can have another luminance value than completely black or completely white.

Some embodiments may be configured to solve this problem by first analyzing the display system for defective pixels and adding this information to the luminance map (and/or chrominance map) of the display. In addition to the transfer curve of each individual pixel, for example, information about pixel defects may also be added to this map. The correction algorithm may then behave differently if a pixel is to be corrected that is marked as being defective or if a pixel is being corrected that has a defective pixel in its neighborhood. For example, the correction algorithm may try to make the luminance output as uniform as possible and also try to minimize the visibility of the defect. This can be done for instance by applying a special correction algorithm for defective pixels and pixels in the neighborhood of the defect. An algorithm for masking faulty sub-pixels by modifying values of nearby sub-pixels as described in International Patent Publication No. WO03/100756 may be used.

Another correction algorithm that may be used is described in European Patent Application No. EP1536399 (03078717.0), entitled "Method and device for visual masking of defects in matrix displays by using characteristics of the human vision system." At least some embodiments including such an algorithm may be applied to solve the problem of defective pixels and/or sub-pixels in matrix displays by making them almost invisible for the human eye under normal usage circumstances. This may be done by changing the drive signal of "masking elements," or non-defective pixels and/or sub-pixels in the neighborhood of the defective pixel or sub-pixel. The document EP1536399 describes, for example, a method and device for making pixel defects less visible and thus avoiding an incorrect image interpretation even without repair of the defective pixels, the method being usable for different types of matrix displays without a trial and error method being required to obtain acceptable correction results. Such a method and device are now described.

By a defective pixel or sub-pixel is meant a pixel that always shows the same luminance, i.e. a pixel or sub-pixel stuck in a specific state (for instance, but not limited to, always black, or always full white) and/or color behavior independent of the drive stimulus applied to it, or a pixel or sub-pixel that shows a luminance or color behavior that shows a severe distortion compared to non-defective pixels or sub-pixels of the display (due e.g. to contamination). For example a pixel that reacts to an applied drive signal, but that has a luminance behavior that is very different from the luminance behavior of neighboring pixels, for instance significantly more dark or bright than surrounding pixels, can be considered a defective pixel. By visually masking is meant minimizing the visibility and/or negative effects of the defect for the user of the display.

A defect may be caused by a defective display element or by an external cause, such as dust adhering on or between display elements for example. One method for reducing the visual impact of defects present in a matrix display comprising a plurality of display elements, as described in EP1536399, includes providing a representation of a human vision system. Providing a representation of the human vision system may comprise calculating an expected response of a human eye to a stimulus applied to a display element.

For calculating the expected response of a human eye to a stimulus applied to a display element, use may be made of any of a point spread function, a pupil function, a line spread function, an optical transfer function, a modulation transfer function or a phase transfer function of the eye. These functions may be described analytically, for example based on using any of Taylor, Seidel or Zernike polynomials, or numerically.

The range of embodiments is not limited to any particular manner of describing the complex pupil function or the PSF. The description may be done analytically (for instance but not limited to a mathematical function in Cartesian or polar coordinates, by means of standard polynomials, or by means of any other suitable analytical method) or numerically by describing the function value at certain points. It is also possible to use (instead of the PSF) other (equivalent) representations of the optical system such as but not limited to the 'Pupil Function (or aberration)', the 'Line Spread Function (LSF)', the 'Optical Transfer Function (OTF)', the 'Modulation Transfer function (MTF)' and 'Phase Transfer Function (PTF)'. Clear mathematical relations exist between such representation-methods, so that it may be possible to transform one form into another form.

In one example, such a method includes a mathematical model that is able to calculate the optimal driving signal for the masking elements in order to minimize the visibility of the defect(s). It may be possible to use the same algorithm for different display configurations, because it uses some parameters that describe the display characteristics. The model may be based on characteristics of the human eye, describing algorithms to calculate the actual response of the human eye to the superposition of the stimulus applied (in this case, to the defect and to the masking pixels). In this way the optimal drive signals of the masking elements can be described as a mathematical minimization problem of a function with one or more variables. It is possible to add one or more boundary conditions to this minimization problem. Examples when extra boundary conditions may be needed may include cases of defects of one or more masking elements, limitations to the possible drive signal of the masking elements, dependencies in the drive signals of masking elements, etc.

A method for reducing the visual impact of defects present in a matrix display as described in EP1536399 also includes characterizing at least one defect present in the display, the defect being surrounded by a plurality of non-defective display elements. Characterizing at least one defect present in the display may comprise storing characterization data characterizing the location and non-linear light output response of individual display elements, the characterization data representing light outputs of an individual display element as a function of its drive signals.

A method may further comprise generating the characterization data from images captured from individual display elements. Generating the characterization data may comprise building a display element profile map representing characterization data for each display element of the display.

A method for reducing the visual impact of defects present in a matrix display as described in EP1536399 also includes deriving drive signals for at least some of the plurality of non-defective display elements in accordance with the representation of the human vision system and the characterizing of the at least one defect, to thereby minimize an expected response of the human vision system to the defect. Minimizing the response of the human vision system to the defect may comprise changing the light output value of at least one non-defective display element surrounding the defect in the display. When minimizing the response of the human vision system to the defect, boundary conditions may be taken into account. Minimizing the response of the human vision system may be carried out in real-time or off-line.

A method for reducing the visual impact of defects present in a matrix display as described in EP1536399 also includes driving at least some of the plurality of non-defective display elements with the derived drive signals.

In a system as described in EP1536399 for reducing the visual impact of defects present in a matrix display comprising a plurality of display elements and intended to be looked at by a human vision system, first characterization data for a human vision system is provided. For example, the first characterization data may be provided by a vision characterizing device having calculating means for calculating the response of a human eye to a stimulus applied to a display element.

A system as described in EP1536399 includes a defect characterizing device for generating second characterization data for at least one defect present in the display, the defect being surrounded by a plurality of non-defective display elements. The defect characterizing device may comprise an image capturing device for generating an image of the display elements of the display. The defect characterizing device may also comprise a display element location identifying device for identifying the actual location of individual display elements of the display.

A system as described in EP1536399 for reducing the visual impact of defects present in a matrix display also includes a correction device for deriving drive signals for at least some of the plurality of non-defective display elements in accordance with the first characterization data and the second characterizing data, to thereby minimize an expected response of the human vision system to the defect. The correction device may comprise means to change the light output value of at least one non-defective display element surrounding the defect in the display. Such a system may also include means for driving at least some of the plurality of non-defective display elements with the derived drive signals.

A control unit as described in EP1536399 for use with a system for reducing the visual impact of defects present in a matrix display, the display comprising a plurality of display elements and intended to be looked at by a human vision system, includes a first memory for storing first characterization data for a human vision system and a second memory for storing second characterization data for at least one defect present in the display. The first and the second memory may physically be a same memory device.

Such a control unit also includes modulating means for modulating, in accordance with the first characterization data and the second characterization data, drive signals for non-defective display elements surrounding the defect so as to reduce the visual impact of the defect. A matrix display device as described in EP1536399 for displaying an image intended to be looked at by a human vision system may include such a control unit and a plurality of display elements.

In another configuration, the correction algorithm skips the pixels in the neighborhood of a defect, which may avoid a problem that correction makes the defect more visible. A further configuration uses an average correction of pixels and/or subpixels in a neighborhood of the defect (wherein the average may include or exclude the defective pixel itself) to correct the defective pixel and/or pixels in the neighborhood of the defective pixel.

Note that the same principle may be valid even if the pixel (or sub pixel) is not completely defective. For example, the luminance behavior may differ significantly due to reasons that may include, but are not limited to, dust in the LC cell (which may result in small bright or dark spots), dirt or contamination in or on the LC glass, and dirt or contamination in or on a protective glass above the LCD. Information on such types of "defects" may be added to the luminance map of the display, and the correction algorithm may use such information to change its behavior in a neighborhood of the defect.

For example, contamination or dirt in the LC cell of a pixel may cause light to scatter, resulting in severe light leakage inside the cell. One result may be tiny but extremely bright and visible spots if that pixel is driven to a dark video level. If the cell is driven to display a dark video level, then this leakage may be several magnitudes more bright than the normal luminance for a pixel driven to that video level, and thus may be extremely visible. At a bright video level, however, the effect of the defect may become nil or negligible.

It is possible that due to the brightness of the light leakage, even neighboring LCD pixels are perceived as being bright by the imaging device. In one example, the light leaking from this cell is captured by an imaging device that is used to characterize the LCD. In front of that imaging device may be a lens in which light scattering takes place. If the leakage light is very bright, then it could even impact the luminance of neighboring LCD pixels due to scatter in the LCD display and/or in the lens in front of the imaging device. Alternatively, the bright spots due to leakage can cause saturation in a sensor of the imaging device, such as a CCD (charge-coupled device) sensor. In that case, the saturated site may affect neighboring sites (blooming), such that a bright pixel can affect how neighboring pixels are imaged, resulting in smear in the captured image. In such a situation of scattering and/or saturation, applying a regular correction algorithm that does not account for such effects could result in severe and very visible artifacts in a large area around this defect, as the algorithm may be configured to decrease the output luminance of the LC cell containing the defect and also of a lot of other LCD pixels in the neighborhood of the defect.

In such case, information on this defect may be added to the luminance map of the display, and the correction algorithm may be configured to behave differently in the neighborhood of such a defect. For example, the correction algorithm may ignore the defect and correct an area around the defect (such as an area of which the luminance of LCD pixels is influenced because of the defect) using an average or typical correction of a broader area in that area of the display or of an area of the display that has similar characteristics as that area.

To summarize, one improvement to the basic algorithm for correction of non-uniformities is to add information on display defects to the luminance map that is an input for the correction algorithm. In one example, these display defects are detected by an imaging device that is used to image the display. These defects can be divided into categories such as, but not limited to, dead sub pixel, dead pixel, bright sub pixel, bright pixel, contamination in LC cell, dust in the LC cell, dust on or in the LC glass, and dust on or in the protective glass on the display.

FIGS. 13-20 show numerous examples of a neighborhood of a defective pixel or subpixel as discussed herein. FIG. 13A shows an organization of red, blue, and green subpixels in a pixel of a color LCD, and FIG. 13B shows a subpixel organization of a monochrome (greyscale) display, which may be obtained by removing or omitting color filters from the LCD panel. The panel may be, for example, a monochrome dual-domain IPS (in-plane switching) or MVA (multidomain vertical switching) display for medical applications. The example organization of pixels in a matrix of FIG. 13C is repeated in the examples of FIGS. 14-20, where the defective pixel or subpixel is indicated in black, and the neighborhood portions are indicated with crosses. Typically a center-to-center distance between pixels of a LCD panel has a value between 0.1 and 0.5 mm (e.g. 0.15 to 0.3 mm) in each of the vertical and horizontal directions.

A neighborhood may be square (e.g. 3×3, 5×5, etc., as in the example of FIG. 14), or may approximate another shape such as a circle (as in the examples of FIGS. 15 and 16). It may include subpixels of one color (as in the example of FIG. 17), or of all the colors (as in the example of FIG. 18), or be weighted in favor of one or more colors. In some applications, a neighborhood that is not continuous may be desired (as in the example of FIG. 19). In some cases, such as where only a part of a pixel is defective (e.g. due to contamination), part of the pixel itself (e.g. a nondefective part) may be included in the neighborhood (as in the example of FIG. 20). It is expressly contemplated that the disclosure of neighborhoods herein is also extended to greyscale displays, which may also include pixels having subpixels. It is also noted that these or other neighborhood configurations may be used with different panel and/or pixel organizations, such as a PenTile RGBW pixel structure, and that many neighborhoods other than the examples expressly shown here are contemplated.

Of course, other parameters may be stored in addition to the defect type. Such parameters may include without limitation exact defect location (possibly a floating point number for row and column, since some defects may not be directly linked to a particular pixel: for example, contamination in the glass can be in between two LCD pixels) and other information such as luminance value (for instance, for light leakage). Instead of (or in addition to) measuring or obtaining the list of defects using the imaging device, it is also possible to obtain this map of defects from another source such as the manufacturer of the device (for example, stored in a non-volatile memory of the device), or it can even be created by manually inspecting the device.

Once such information on defects is added to the luminance map, the correction algorithm can use this information to change its behavior in a neighborhood of such a defect. Potential advantages of such a configuration include obtaining a more optimal correction and avoiding an increase in visibility of the defect. Such a configuration may be described as prefiltering of the correction and/or luminance map.

Another reason to prefilter the luminance and/or correction map could be that the measurement data is rather noisy, so that it may be desirable to apply a low-pass filter to the luminance and/or correction map (for example, to partially remove this noise) or to reject outliers in the map and replace these values by more typical values. Many statistical methods exist that may be used for automated detection and/or correction of outliers in measurement data. For example, a temporal filter and/or a median filter or k-nearest-neighbor median filter may be used. Alternatively, outliers may be detected based on a comparison of a threshold value to a distance measure (such as Euclidean distance or the Mahalanobis distance), and a detected outlier value may be replaced by e.g. an average of the measured values in a neighborhood of the outlier.

Another potential disadvantage of a basic version of the algorithm for correcting non-uniformities is a severe reduction in display luminance and contrast. If the display response is made perfectly uniform across all pixels, then the maximum brightness of the display may be constrained to the minimum of all pixels (as determined when all pixels are driven to maximum). This is because we cannot increase the actual brightness of pixels if they are already driven to their maximum value. The same holds for the minimum brightness (low video level), in that the lowest display luminance may be constrained to the luminance of the brightest pixel of the display when the pixels are driven to minimum brightness. These two constraints may lead to a reduction in the contrast ratio of the display.

Further embodiments may be configured to provide a solution for such a problem. For example, a correction apparatus or method may be configured not to make the display as uniform as possible but rather to make the user perceive the display as uniform as possible. Such an embodiment may be configured in accordance with information that the human eye is far from perfect and that some variations in luminance and color (and therefore also non-uniformities) cannot be perceived.

Several models of the human eye exist, such as the Barten mode, which is a model describing the contrast sensitivity function of the human eye (e.g. as described in Barten, Peter G. J. (1999), Contrast Sensitivity of the Human Eye and Its Effects on Image Quality, SPIE Press, Bellingham, Wash.), and also more complex models such as the proprietary JND-Metrix model (Samoff Corporation, Princeton, N.J.). Any model of the human visual system may be used to modify a correction algorithm to increase the contrast and peak luminance of a display system while still keeping the same impression of luminance and/or color non-uniformity. For example, any of these models of the human visual system may be used to configure the correction algorithm to correct predominantly or exclusively for those non-uniformities in luminance and/or color that can actually be perceived by the human observer (or any other observer, such as but not limited to another type of animal, a sensor as may be used in a machine vision application, etc.).

For example, a model of the contrast sensitivity function describes which spatial sine-wave patterns can be perceived by the (e.g. human) observer. For each specific sine-wave frequency (in cycles per degree, for instance), the model describes an amplitude threshold (% modulation) that is required in order for a human observer to be able to see this sine-wave pattern. Consequently, if a display system has non-uniformities containing spatial frequencies for which the amplitude is below the visual threshold, then according to the model these non-uniformities will not be visible for the human observer. Therefore there is also no need to try to correct for these non-uniformities, and modifying the correction algorithm according to the model may result in smaller corrections required and therefore less loss in peak luminance and contrast ratio.

Such a principle may also be used to only partially correct for non-uniformities. If a particular non-uniformity is visible for the human eye, according to the model, then it may be desirable to apply a correction, not to achieve perfect uniformity, but on the other hand to achieve sufficient uniformity so that the remaining non-uniformity is not noticeable anymore for the human observer (based on the model). A potential advantage of only partially correcting for non-uniformities is to increase the remaining peak luminance and contrast ratio of the display system after correction. Of course it is possible to take some safety margin in the correction to make sure that more sensitive observers (i.e. exceptional cases) will not be able to see the remaining non-uniformities.

A typical example is the luminance fall-off near to the borders of the display. This luminance fall-off is typically a low spatial frequency. Especially for lower spatial frequencies the human eye is not very sensitive, so that it will be very difficult for the eye to perceive this luminance fall-off. At the same time, this luminance fall-off is typically rather large (30% lower luminance at the borders as compared to the center), so that if the luminance fall-off were corrected perfectly, a large loss of peak luminance and contrast ratio could result. Embodiments include configurations in which this luminance fall-off is not corrected for or, alternatively, is corrected for only partially so that the luminance fall-off just becomes invisible for the human eye. A potential advantage of such a configuration is that the contrast and peak luminance loss will be much smaller.

Figure 12:
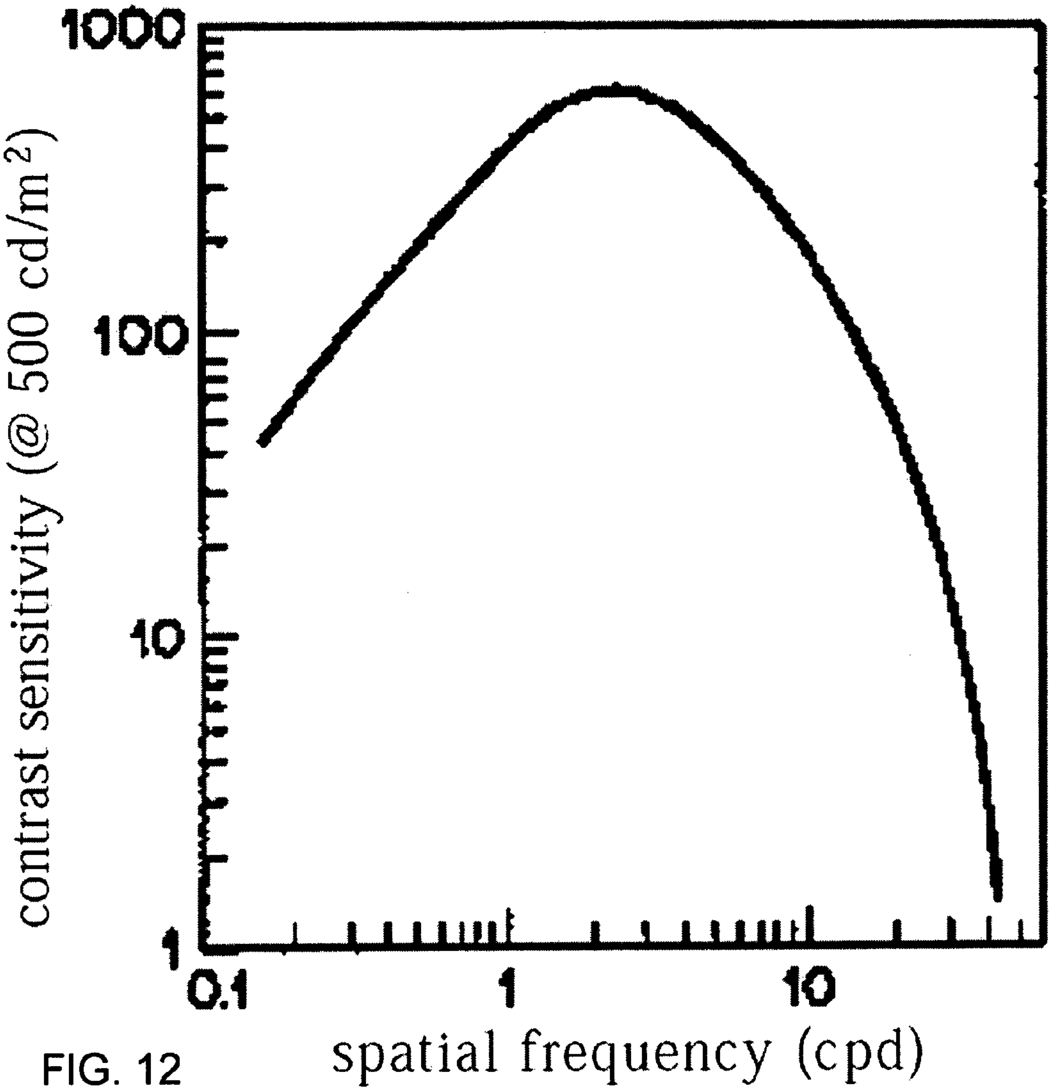
FIG. 12 shows an example of a contrast sensitivity function.
Figure 13A:
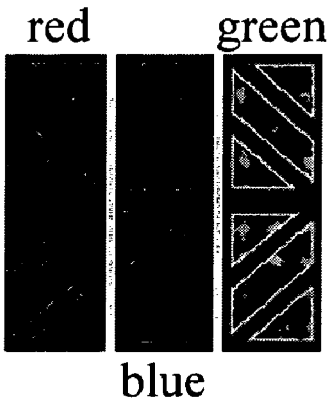
Figure 13B:
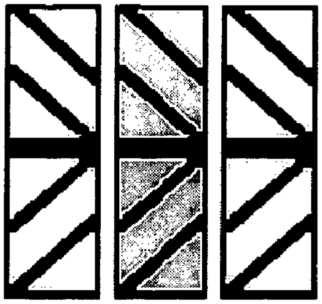
Figure 13C:
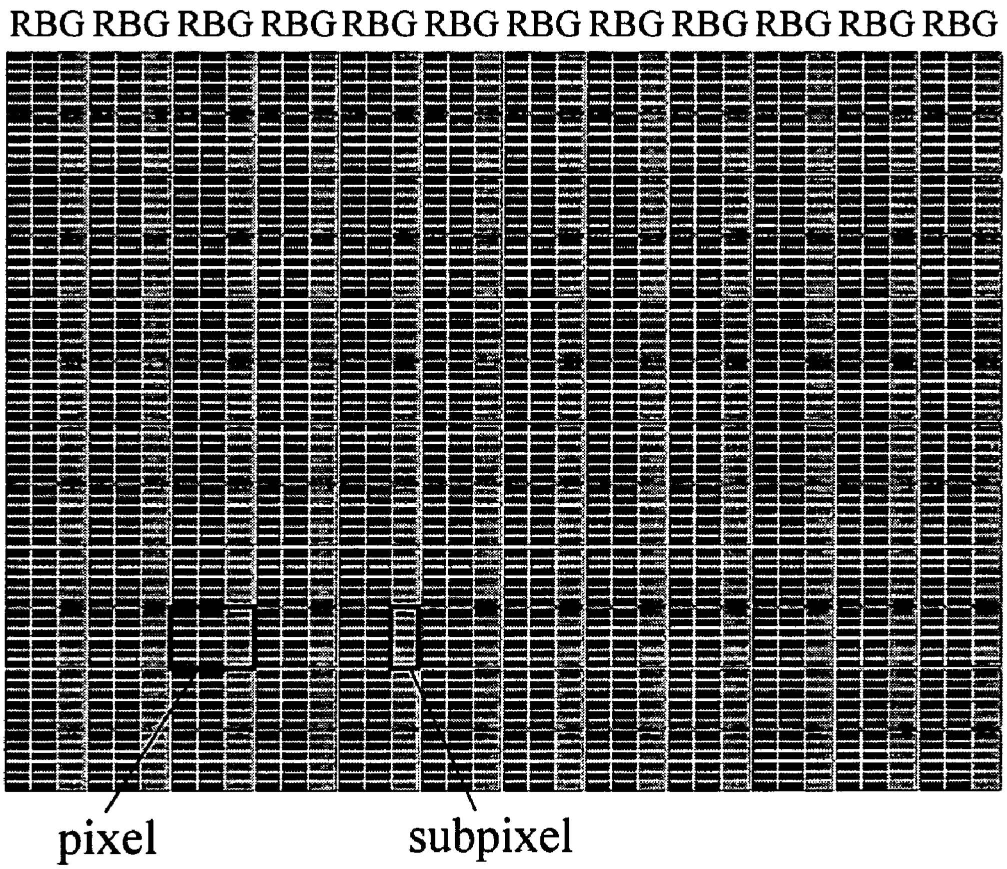
Figure 20:
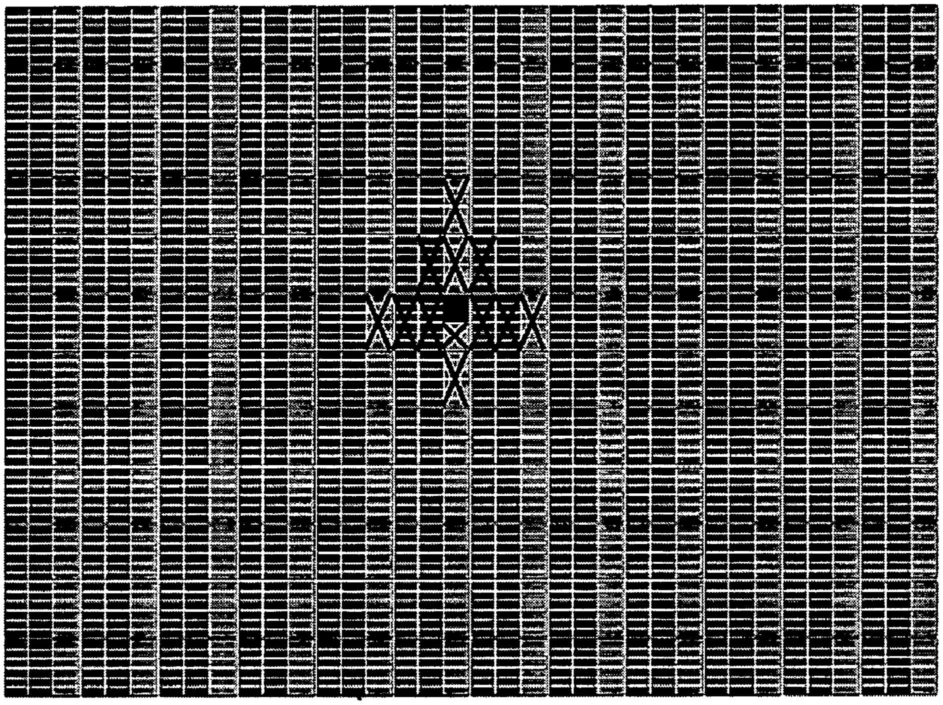

FIG. 12 shows an example of a contrast sensitivity function, here expressed as a plot of sensitivity vs. spatial frequency (in cycles per degree). This image shows the sensitivity (so not the threshold) of the eye to sine-wave patterns of specific spatial frequency. Also note that this contrast sensitivity function depends on the absolute luminance value (in this example, 500 cd/m$^2$). According to this perceptibility model, it may be desirable to correct nonuniformities to increase visibility of an area of an image having a spatial frequency greater than 0.1 cycles per degree, while nonuniformities affecting visibility of spatial frequencies greater than 10 cycles per degree may be ignored (in another example, the range of frequencies of interest may be narrowed to, e.g., 1-8 cycles per degree). The distance in the viewing plane of the display device which corresponds to a degree or portion thereof may be determined according to a customary or recommended viewing distance, which may be in the range of 50 to 120 centimeters (e.g. 65-100 cm) for medical applications. For example, a frequency of one cycle per degree corresponds to a period of about 8.7 millimeters at a distance of 50 cm, and to a period of about 2.1 cm at a distance of 120 cm.

In another embodiment, perceptibility is determined on a basis of separation of features by arc-minutes (sixtieths of a degree). For example, it may be assumed that points less than one arc-minute apart will not be distinguished by the observer. Again, the distance in the viewing plane of the display device which corresponds to a degree or portion thereof may be determined according to a customary or recommended viewing distance, which may be in the range of 50 to 120 centimeters (e.g. 65-100 cm) for medical applications.

For example, an angle of one arc-minute corresponds to a distance of about 0.15 mm in a perpendicular plane 50 cm distant, and to a distance of about 0.35 mm in a perpendicular plane 120 cm distant.

The range of embodiments includes configurations in which the magnitude of one or more components corresponding to a range of frequencies is increased relative to a magnitude of components corresponding to frequencies above and below the range (alternatively, a magnitude of components corresponding to frequencies above and below the range is reduced). For example, a magnitude of a component having a spatial period between one and fifty millimeters may be increased relative to a magnitude of a component having a spatial period less than one millimeter and a magnitude of a component having a spatial period greater than fifty millimeters.

As already mentioned, much more complex models can be used to determine whether or not non-uniformity is visible for the human observer or not, and the scope of disclosed embodiments is not limited to any particular model or set of models. The same idea of perceptibility-based correction may also be applied for correction of color displays, in that correction of luminance and/or color difference may be limited according to a determination of what can actually be observed by the human observer. In such case, a program, package, or methodology such as JNDMetrix (Sarnoff Corp. Princeton, N.J.), for example, may be used in making the determination. Alternatively or additionally, an extension of the contrast sensitivity function to color perception may be applied.

A method of analysis and correction that takes account of visibility need not be limited to a frame-by-frame basis. Typically, a video sequence of images will be differently perceived compared to still image frames. Therefore deciding if specific noise is visible or not may also include analyzing a sequence of images, and also in this situation a program, package, or methodology such as the JNDMetrix tool may be used. The various modes available for the correction of a particular defect may also be increased by applying a different modification to the same pixel or area of a display at different times. For example, such corrections may be applied in accordance with an expected temporal sensitivity of the observer. A series of two or more different corrections over time may be applied even in a case where the original image signal mapped to that pixel or area remains constant or relatively constant.

Embodiments configured to correct non-uniformities according to their perceptibility or observability may include preprocessing the correction map. Such preprocessing may be performed on a basis other than pixel-by-pixel. For example, the correction value of a particular pixel may depend not only on that pixel but also on pixels and/or subpixels in its neighborhood, or even on the behavior (e.g. required correction, luminance behavior, color behavior) of many or all other pixels of the display, and possibly even on one or more pixel values of the display during another frame.

It may be desirable to perform such a correction (e.g. based on perceivability or observability) on luminance values rather than on digital driving values. In one example, the "visibility" analysis is done in the luminance domain, and the result is a required correction in the luminance domain. The correction may then be translated (e.g. by means of the inverse transfer curve of each pixel) to the digital driving level domain.

A determination of whether a non-uniformity (luminance and/or color) can be perceived may be done in different ways. One could do this visibility test based on the luminance and/or color behavior of the pixels (transfer curve) as measured by the imaging device. In one implementation, for each pixel of the display (or of some portion of interest of the display), the transfer curve is measured, resulting in a luminance map for the display. For example, the transfer curve may be measured for each pixel at several luminance levels, resulting in a luminance map for the display at several luminance levels. Based on the luminance map, a best correction is calculated, e.g. the correction that results in lowest reduction in luminance and/or contrast when only those non-uniformities that are shown to be visible on that map are corrected. Then one could use this calculated correction map in the future to pre-compensate images to be shown on that display. In most situations such a method will work fine and will give nearly optimal performance.

However, in theory such a method may not be the optimal solution. Indeed, the actual image contents shown on the display (the actual image being displayed at any time) also affects whether and to what extent a particular uniformity in that image will be visible. For instance, it is typically much easier to see a non-uniformity when a uniform background is shown on the display, as compared to when a realistic photographic image is displayed. Therefore, it may be desirable to calculate a correction map (or a modification of such a map) based on a characteristic of the actual image being displayed, and potential advantages of such an implementation may include further reduction in peak-luminance and contrast ratio. Such calculation can be done by one or more of the same methods as described before (e.g. contrast sensitivity function, JNDmetrix), and it may be done in software (each time the image changes, for instance) and/or in hardware, and off-line and/or on-line (in real-time).

A particular implementation is described now as an example. In medical imaging, such as in mammography, radiologists often base their diagnosis on very small and subtle differences in the medical image. Therefore noise that becomes visible as small high-frequency structures may have much more negative impact on the quality of diagnosis as compared to large-area low-frequency noise structures. Therefore, it is often more important that high-frequency noise is reduced much more than low-frequency noise, or even that only high-frequency noise is reduced.

As described above, a potential advantage of not compensating for low-frequency components of the display noise is that the remaining peak luminance and contrast ratio after noise reduction will be higher. The terms "high-frequency" and "low-frequency," as used here with reference to noise structures or noise components, indicate spatial frequencies (and/or direction: the noise could be in horizontal or vertical direction or a combination of both) that may depend on the relevant structures in the images being displayed. If relevant clinical structures in a medical image have a spatial period (where the period is defined as being 1/frequency) of only a few pixels, for example, then it may be desirable to reduce high-frequency noise in the form of a noise structure or component having a spatial period equal to or lower than the period of the relevant clinical structures. Of course it is possible to take some safety margin in calculating for which frequencies noise reduction should be applied.

In some cases, it may be desired to use complex mathematical models to predict the visibility of non-uniformities (in other words, noise). In other situations, it may be desired to use ad-hoc models such as splitting the noise pattern (or, alternatively, the luminance map and/or the correction map) into frequency bands and assigning gain factors for each band that determine whether and to what extent the noise pattern in that band will be reduced (i.e. to what extent the image will be compensated for that noise).

For example, if we split the noise pattern into two bands (e.g. a low-frequency band of noise patterns with period higher than or equal to 32 display pixels, and a high-frequency band with frequencies having periods lower than 32 display pixels), then we could assign a gain factor such as 1.0 to the high-frequency band, meaning that the noise patterns in this frequency band will be completely corrected for. The low-frequency band could be assigned a gain factor such as 0.2, meaning that the ideal correction coefficients needed to compensate for the noise in that band will be multiplied by 0.2, resulting in a less than complete compensation for noise in that frequency band. In some embodiments, it may be desired to apply a low-valued gain factor to a low-frequency component, a high-valued gain factor to a high-frequency component, and a low-valued gain factor to a component of even higher frequency, such that less visible components on both sides of the spectrum are less compensated than a more visible component between them.

Note that the scope of disclosed embodiments is not limited to any particular number or range of frequency bands. Also, it is possible to define continuous bands in order to reduce or avoid any discontinuities at the border between two bands. For example, such a method or apparatus may be implemented so that a gain factor changes gradually from one band to another.

Also note that in practice it may not be optimal to apply the gain factor to the correction map in a case where the native transfer function of the display is not linear. To illustrate, suppose we split the display noise into two frequency bands: a low-frequency band and a high-frequency band. Also assume that a specific pixel, when driven at level 234, should have corrected pixel value 250 when corrected perfectly (with a target of perfect uniformity over the display area). This means that the correction value would be +16 video levels for that pixel. Assume for example that we only want to correct for the high-frequency noise patterns, such that we apply a gain factor of zero for the low frequencies. Furthermore as an example assume that the correction of +16 video levels includes a +12 correction due to low-frequency noise and a +4 correction due to high-frequency noise. Then a simple reasoning would suggest that the desired correction value for correcting high-frequency noise would be +4. However, this would only be correct if the transfer function of the display is linear in this interval. Thus, it may be desirable to consider the correction to be applied in the luminance domain rather than in the digital driving level domain. In this case, although the +4 correction corresponds to the desired high-frequency correction around video level 250, it might not correspond to the desired (or correct) correction at the lower video level 234 if the transfer curve of that pixel is not sufficiently linear in the range being considered.

Thus, it may be desirable to do the split between the frequency bands not on the digital driving level values (on the correction values) but rather in the luminance domain. In one example, the noise map is expressed in absolute luminance values (e.g. in cd/m$^2$), and the division into frequency bands is done on this data. Such a dividing into frequency bands can for example be done using a transformation to a frequency domain such as the Fourier domain. The noise map is transformed to the Fourier domain, and the result is a map of coefficients in the Fourier domain. Then in this map the gain factors can be applied directly to the Fourier coefficients. If we then apply the inverse transform back to the luminance domain, then we have the desired corrected luminance values corresponding to the correction according to the frequency bands selected and gain factors selected.

The scope of disclosed embodiments is not limited to any particular method of performing a division into frequency bands or of applying the gain factors. Other methods that may be used, for example, are based on a wavelet or other transform and/or are based solely on operations in the luminance domain. Once the luminance values corresponding to the desired correction have been obtained, these luminance values can be easily transformed into digital driving value correction values by, for example, applying the inverse transfer curve for each individual pixel being corrected.

Methods as described herein may also be applied to correction of color non-uniformity. For example, determining whether a non-uniformity is visible may again be done according to a luminance map (or luminance and chromaticity map) and/or according to an actual image to be shown on the display, and correction may include processing of chromaticity values.

Yet another improvement to a basic algorithm for correction of non-uniformities is increasing the number of gray shades. Consider a display system with 1024 shades of gray. After correcting for the non-uniformities, not all of the pixels will be driven between their minimum (0) and maximum (1024) value anymore. This is because some pixels have higher or lower peak luminance value and minimum luminance value than other pixels. Moreover, the number of gray shades may now depend on the spatial location on the display.

For demanding applications such as medical imaging, an inability to guarantee that a small difference in gray level can be perceived at all locations on the display (suppose we want to show an image containing 1024 shades of gray) may be unacceptable. The fact alone that a small difference could be visible at one location on the display and not at another location on the display is most likely not acceptable for many applications.

Embodiments also include configurations in which the number of output shades of gray of the display system is chosen to be higher than the maximum number of gray shades that are input to the display system. For example, if the input to the display has 1024 shades of gray, then the correction map in such an configuration has a resolution of more than 1024 shades of gray (for instance, 2048 or 4096, although the scope of disclosed embodiments is not limited to either of these examples or to any particular numbers).

In one such example, a particular pixel input gray value of 234 (in a resolution of 1024 shades of gray) is converted to a corrected output gray value 256.25 (as denoted in a system of 1024 shades of gray) or, equally, 1025 (as denoted in a system of 4096 shades of gray). Thus 4096 correction values are available in this example for the correction of 1024 input values. It may be desirable to choose the number of output shades of gray to be high enough that it will always be possible, for any pixel, to select correction values such that no pair of input values is mapped to the same output value after correction, although a smaller degree of expansion may be acceptable for other applications.

It is possible to apply such a method so that at all locations on the display, the display system has the same number of gray shades after correction. Note that such a technique may also be used for correction of color non-uniformities. The higher number of gray shades may, for instance, be created by using an error diffusion technique such as dithering. Such a technique may be applied spatially (e.g. over some neighborhood) and/or temporally (e.g. over two or more frames). Any error diffusion or dithering technique may be used, such as (but not limited to) Floyd-Steinberg, Stucki, or Stevenson-Arce dithering. In at least some cases, such a technique may even be applied to display more gray shades than are natively available on the display system.

Although correction of individual pixel values is described above, it is also expressly contemplated that correction as disclosed herein may be performed on sets or zones of pixels, where individual pixel correction values may be obtained by interpolation (e.g. linear, bilinear, cubic) or any other method that calculates individual correction values out of the zonal correction values. A potential advantage of set- or zone-based correction is a reduction in the computational complexity of the algorithms.

According to further embodiments, a technique of noise reduction is optimized for medical imaging. Ultimately, it may be desired to apply noise reduction in such a way that the quality of diagnosis is increased. Therefore it may be desirable to understand which noise structures really can impact the accuracy of diagnosis and/or what the effects of noise reduction are (e.g. both positive effects, such as lower noise, and negative effects, such as lower contrast ratio and peak luminance).

In one example of such an algorithm, a first task includes measuring the luminance behavior of the display, e.g. as described above. In particular, such a task may include measuring the luminance behavior (and therefore noise) of each individual pixel (or groups of pixels). A next task includes determining whether or not the measured noise can lower the quality of diagnosis for the particular application being executed at that particular time (for instance, but not limited to, mammogram reading, chest X-ray reading, lung nodule detection, CT scan reading, etc.). This task may be based on information about the clinical features in the medical images being studied. For example, such information may be used to determine whether the noise pattern of the display can have negative impact on the accuracy of diagnosis for this particular application. Further, such information may be used to determine which parts or components of the display noise pattern may have a negative impact on the accuracy of diagnosis and/or how strong such negative impact is expected to be.

In reading mammogram images, for example, the contrast ratio of the display may be very important, and also high-frequency noise may have a significant negative impact on a quality of the diagnosis. Moreover, it may be likely that a radiologist examining the image will be looking especially for circular or elliptical structures. Embodiments may be configured to apply the noise reduction in such a way that, for example, circular and/or ellipse-like noise structures will be compensated for. Such an embodiment may be configured such that the only operation is to compensate for circular or ellipse-like structures, or other noise reductions as disclosed herein may be applied as well. A task of identifying such structures may include applying one or more shape-discriminant filters (such as Gabor filters) to the luminance map. In an application such as this particular one, it may also be desirable to achieve a balance between contrast ratio and applying noise reduction. Moreover, it may be desirable to apply noise reduction only to high-frequency noise. Such a principle may also be applied to color non-uniformities, and identification of relevant structures may be done on the luminance map and/or a chromaticity map.

In one implementation, a luminance noise map is analyzed according to the following algorithm. In a first task, the luminance noise map is transformed to the Fourier domain. In the Fourier domain, frequencies corresponding to clinically relevant structures are multiplied with a gain factor of 1.0, and other coefficients not corresponding to those frequencies are multiplied with a gain coefficient of zero. To avoid artifacts or discontinuities, coefficients in between the two extremes (corresponding to relevant frequencies, and not corresponding to relevant frequencies) may be assigned gradually changing multiplication factors between 1.0 and zero.

Once the multiplication factors are applied, the luminance noise map is transformed back from the Fourier domain to the luminance domain. Then a difference between the original luminance noise map and the resulting map (after processing in the Fourier domain) is calculated. This difference luminance noise map is analyzed for relevant structures, such as the circular and ellipse-like structures that may be relevant for mammograms. The presence of such structures in the difference luminance map indicates that they were removed in the Fourier domain and that a displayed image would not have been compensated for them. Of course this is not the desired result for this application, so if such relevant structures are present in the difference map then these structures are isolated from the background of the difference map and added to the map that was the result of the processing in the Fourier domain.

In such manner, the difference map may be used to verify that no clinically relevant noise structures were removed (and so would not be compensated for) in the processing in the Fourier domain. Any of various methods may be used to add such clinically relevant structures back to the luminance map once they are located, such as isolating the features from the background of the difference map (background subtraction).

Once a final luminance noise map has been determined, then the transfer curve of each individual pixel can be used to transform the luminance values to digital driving level values. One or more of the algorithms described above may then be used to actually carry out the noise reduction in the display.

Note that the above description of a mammography application is only intended to be an example, as other types of structures and other frequency bands may be clinically important for other types of images. A desired trade-off between peak luminance, contrast ratio, and noise levels may also differ for other image types. In some situations, it may suffice to execute fewer than all of the tasks in the above description, and also the order of executing these tasks may vary for different images or applications.

In some cases, an image signal may contain a noise structure or component that has the same shape as a feature it is desired to detect (such as a clinically relevant feature). For example, the image signal may include noise from a detector such as an X-ray device. It may be desirable to remove such noise from the image signal before it is displayed.

In some cases, the noise structure or component may be distinguished from the feature it is desired to detect by its contrast. For example, the noise may have a smaller amplitude (e.g. a lower contrast) than the feature. In a further embodiment, the image signal is processed to remove a signal or level representing a noise floor of the detector. For example, the noise representation may be subtracted from the image signal. It may be desirable to limit such removal to a particular frequency band of the image signal (e.g. a band in which the noise is considered to have a significant component) or to some other component of the image signal (e.g. as distinguished by a shape-discriminant filter). Such an operation may be performed before applying a nonuniformity correction as disclosed herein, or after such correction. For example, an image corresponding to a component of the noise floor of the detector which relates to the feature it is desired to detect (e.g. in terms of its shape) may be subtracted from an image signal that has already been corrected for nonuniformity according to an algorithm as disclosed herein.

It may be desirable to use different specific noise reduction methods for different images or image types (such as a mammogram; a chest image; a CT, MRI, or PET scan). Profiles may be created, for example, that link the use of a specific program to the use of a specific noise reduction method, or that link specific images to the use of specific noise reduction methods. Such a profile may be created at least in part in software. Detecting which noise reduction method to apply may be done automatically according to the image or video sequence to be shown on the display (for instance, based on (without limitation) neural networks that classify images or on statistical characteristics of the images/video). Alternatively or additionally, such detection may be based on inputs (hints or messages) from the applications running on the host PC or on inputs of the user of the display. Embodiments may also be configured such that different parts of the display may simultaneously use different noise reduction methods, as in a case where on the left-hand side a PET image is shown and on the right-hand side a CT image is shown, for example. In some cases, it may be desirable to change the type of noise reduction algorithm used dynamically over time.

Combinations of techniques as described above (such as visibility analysis, tailoring correction according to diagnostic relevance, frequency-based correction) are also expressly contemplated, as are applications of such combinations to greyscale images and to color images as appropriate.

Figure 21:
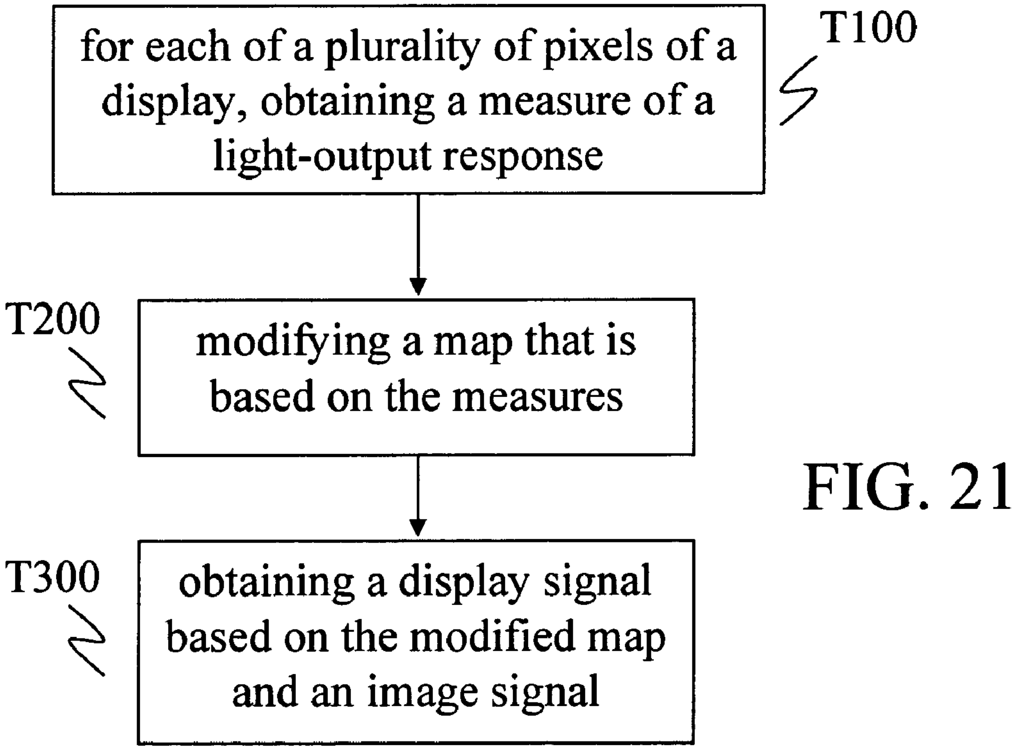
FIG. 21 shows a flow chart of a method M100 according to an embodiment.

FIG. 21 shows a flow chart of a method M100 according to an embodiment. For each of a plurality of pixels of a display, task T100 obtains a measure of a light-output response of at least a portion of the pixel at each of a plurality of driving levels. For example, task T100 may obtain the measures from an image capturing device or may retrieve the measures from storage (e.g. a non-volatile memory of the display). To increase a visibility of a characteristic of a displayed image during a use of the display, task T200 modifies a map that is based on the obtained measures. Based on the modified map and an image signal, task T300 obtains a display signal. Method M100 may be implemented as one or more sets (e.g. sequences) of instructions to be executed by one or more arrays of logic elements such as microprocessors, embedded controllers, or IP cores.

Figure 22:
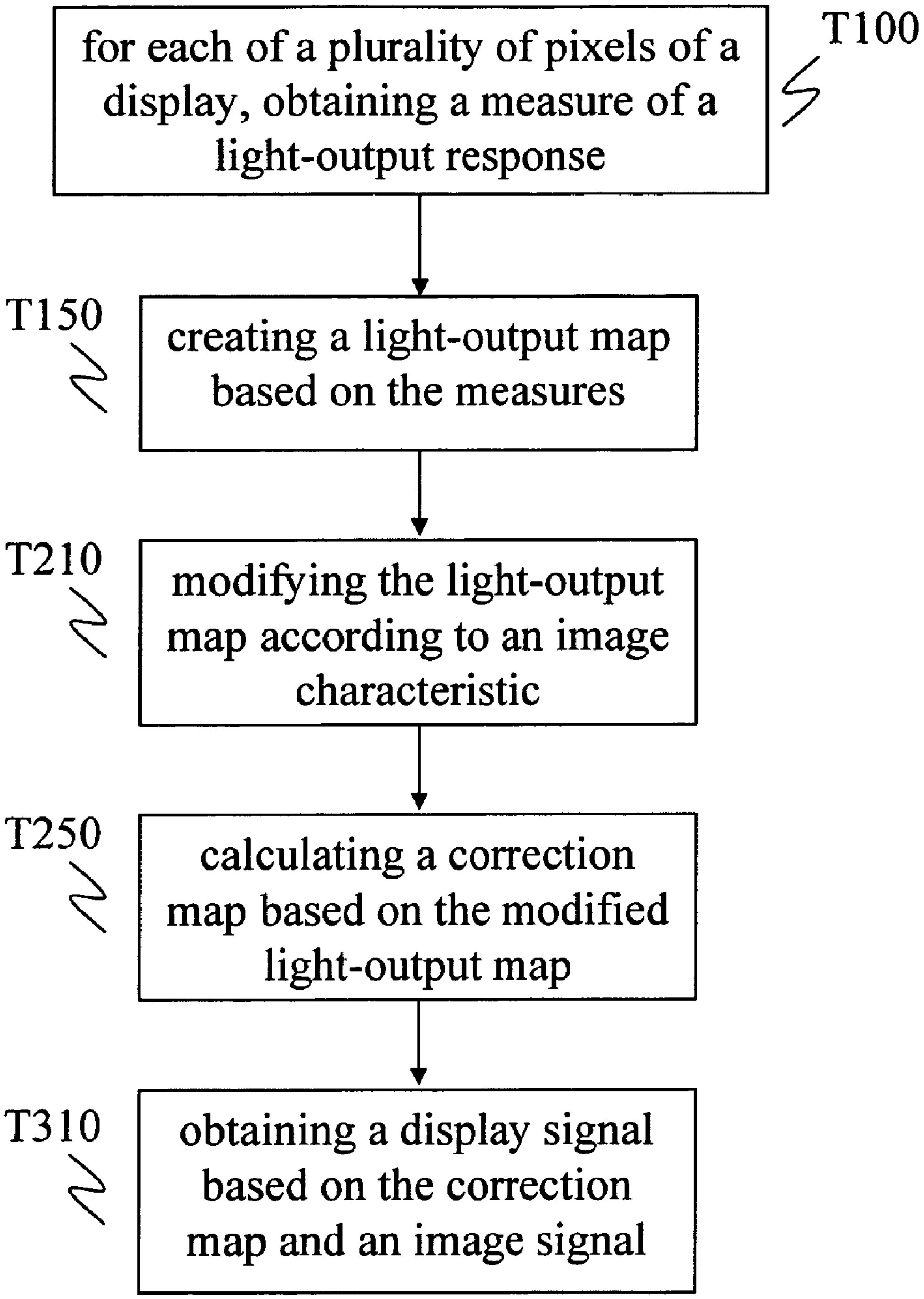
FIG. 22 shows a flow chart of an implementation M110 of method M100.

FIG. 22 shows a flow chart of an implementation M110 of method M100. Task T150 creates a light-output map based on the obtained measures. For example, task TI50 may create a luminance map and/or a chrominance map. Task T210 is an implementation of task T200 that modifies the light-output map according to an image characteristic (e.g. a frequency or feature of interest). Task T250 calculates a correction map based on the modified light-output map. Task T310 is an implementation of task T300 that obtains a display signal based on the correction map and an image signal.

Figure 23:
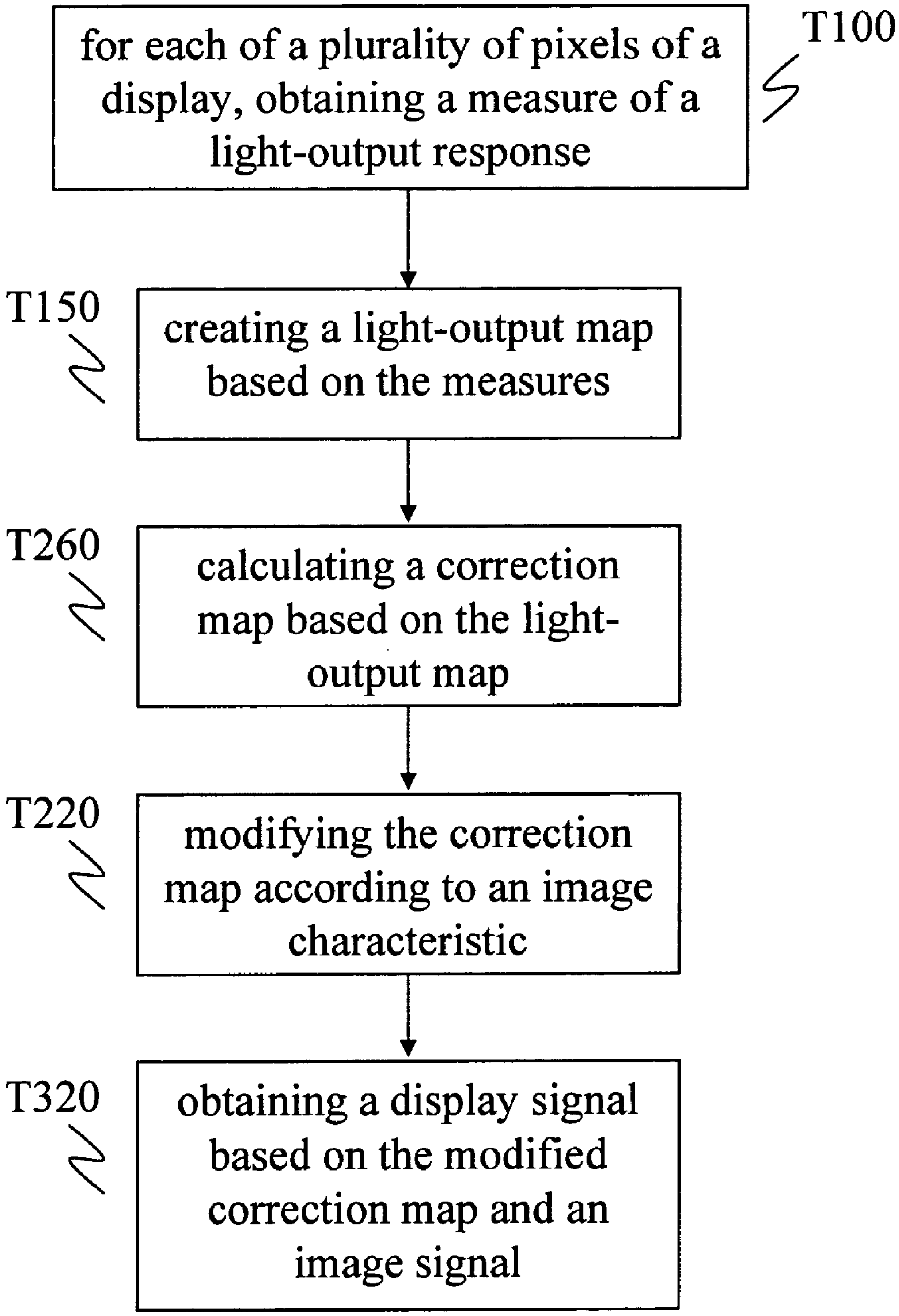
FIG. 23 shows a flow chart of an implementation M120 of method M100.

FIG. 23 shows a flow chart of an implementation M120 of method M100. Task T260 calculates a correction map based on the light-output map. Task T220 is an implementation of task T200 that modifies the correction map according to an image characteristic (e.g. a frequency or feature of interest). Task T320 is an implementation of task T300 that obtains a display signal based on the modified correction map and an image signal. In some applications, task T220 may be altered at run-time to modify the correction map according to a different image characteristic.

Figure 11:
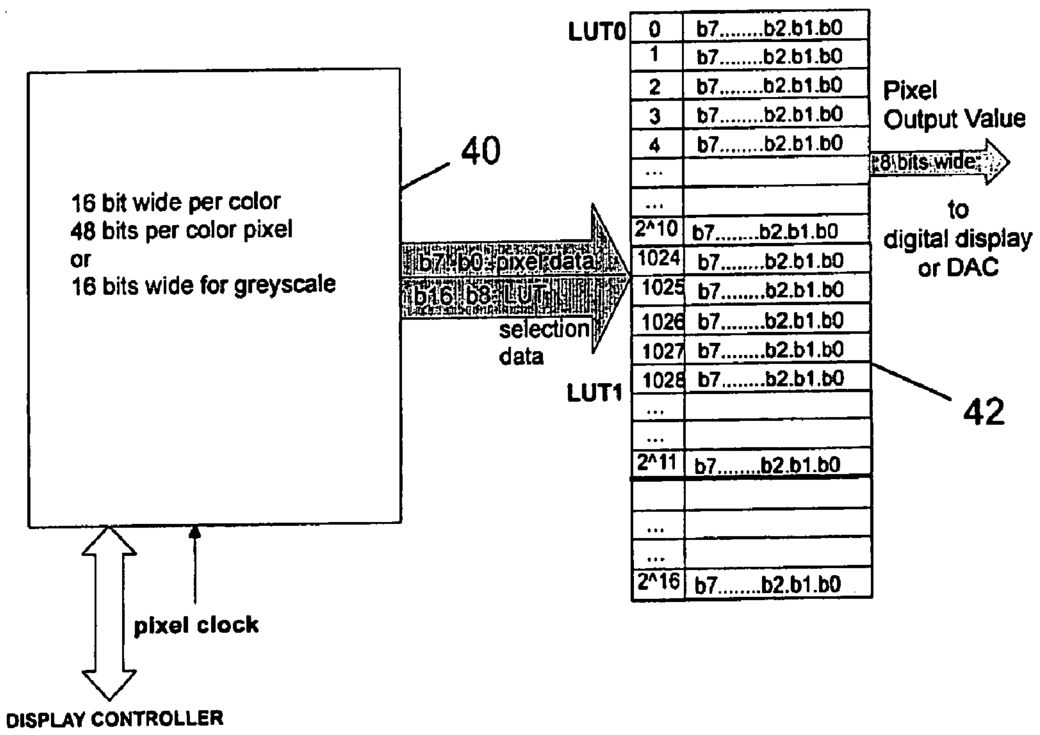
FIG. 11 illustrates an embodiment of a correction circuit.
Figure 24:
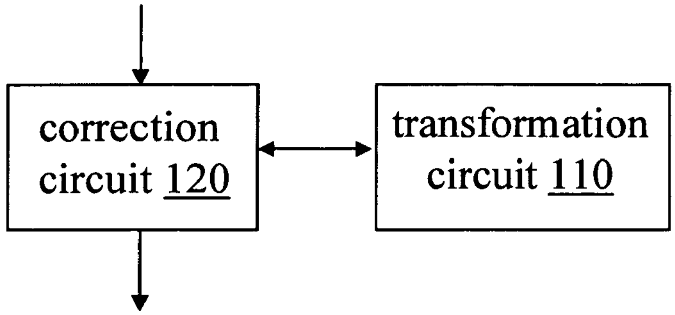
FIG. 24 shows a block diagram of an apparatus 100 according to an embodiment.
Figure 25:
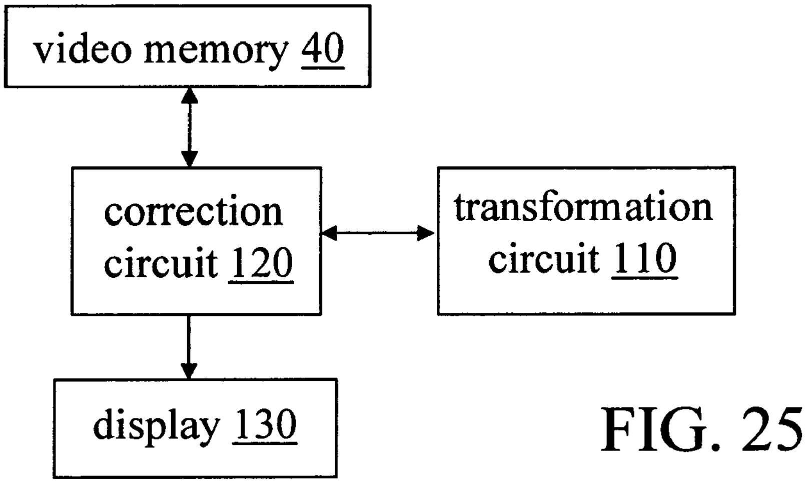
FIG. 25 shows a block diagram of a system 200 according to an embodiment.

FIG. 24 shows a block diagram of an apparatus 100 according to an embodiment. Transformation circuit 110 stores a correction map that may include one or more lookup tables or other correction functions (e.g. according to a classification). For each pixel value, correction circuit 120 obtains a corresponding function or value from transformation circuit 110 and outputs a corrected value for display. As shown in FIG. 11, an apparatus according to an embodiment may also be configured to output display values directly from a lookup table. FIG. 25 shows a block diagram of a system 200 according to an embodiment that also includes video memory 40 and a display 130. Transformation circuit 110 may be implemented as an array of storage elements (e.g. a semiconductor memory such as DRAM or flash RAM) and may be implemented in the same storage device as video memory 40.

Figure 26:
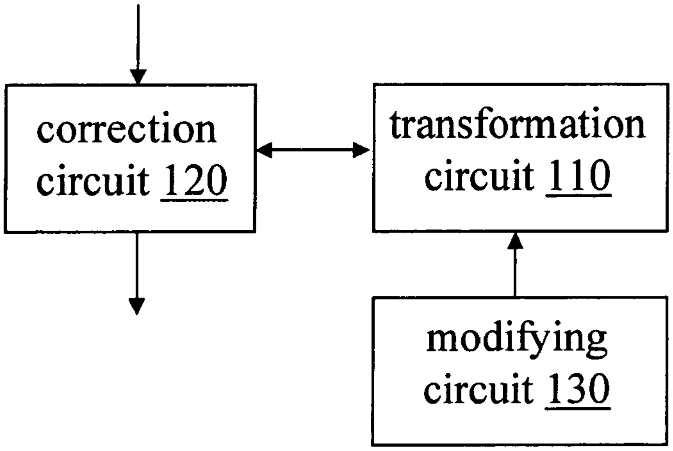
FIG. 26 shows a block diagram of an implementation 102 of apparatus 100.

FIG. 26 shows a block diagram of an implementation 102 of apparatus 100 that includes a modifying circuit 130 configured to calculate the correction map of transformation circuit 110 (e.g. from another correction map, or from a light-output response map) according to a characteristic of an image feature that it is desired to distinguish. Modifying circuit 130 may be implemented to perform any of the methods or algorithms described herein, such as applying different gain factors to different frequency bands of the map. One or both of correction circuit 120 and modifying circuit 130 may be implemented as an array of logic elements (e.g. a microprocessor or embedded controller) or as one of several tasks executing on such an array.

The foregoing presentation of the described embodiments is provided to enable any person skilled in the art to make or use the present invention. Various modifications to these embodiments are possible, and the generic principles presented herein may be applied to other embodiments as well. For example, operations described as obtaining or being performed on or with a luminance map may also be used to obtain or be performed on or with a chrominance map. An embodiment may be implemented in part or in whole as a hard-wired circuit; as a circuit configuration fabricated into a device such as an application-specific integrated circuit (ASIC), application-specific standard product (ASSP), or field-programmable gate array (FPGA) or other programmable array.

An embodiment may also be implemented in part or in whole as a firmware program loaded into non-volatile storage (for example, an array of storage elements such as flash RAM or ferroelectric memory) or a software program loaded from or into a data storage medium (for example, an array of storage elements such as a semiconductor or ferroelectric memory, or a magnetic or optical medium such as a disk) as machine-readable code, such code being instructions executable by an array of logic elements such as a microprocessor, embedded microcontroller, or other digital signal processing unit. Embodiments also include computer program products for executing any of the methods disclosed herein, and transmission of such a product over a communications network (e.g. a local area network, a wide area network, or the Internet). Thus, the present invention is not intended to be limited to the embodiments shown above but rather is to be accorded the widest scope consistent with the principles and novel features disclosed in any fashion herein.

What is claimed is:

1. A method of image processing, said method comprising:

for each of a plurality of pixels of a display, obtaining a measure of a light-output response of at least a portion of the pixel at each of a plurality of driving levels;

to increase a visibility of a characteristic of a displayed image during a use of the display, modifying a map that is based on the obtained measures; and based on the modified map and an image signal that represents at least one physical and tangible object, obtaining a display signal that is configured to cause the display to depict the at least one physical and tangible object.

2. The method of image processing according to claim 1, wherein the map comprises at least one of a luminance map of the display and a chrominance map of the display.

3. The method of image processing according to claim 1, wherein said modifying a map is based on a characteristic of a feature to be detected during display of an image.

4. The method of image processing according to claim 1, wherein said modifying a map is based on a characteristic of a class of images to be displayed.

5. The method of image processing according to claim 1, wherein said modifying a map to increase a visibility of a characteristic of a displayed image includes:

obtaining a characteristic of an image to be displayed; and modifying the map according to the obtained characteristic.

6. The method of image processing according to claim 1, wherein said modifying a map includes modifying the map according to a desired frequency response of the display.

7. The method of image processing according to claim 1, wherein said modifying a map includes modifying the map according to a desired response of the display to a predetermined image characteristic.

8. The method of image processing according to claim 1, wherein said modifying a map includes attenuating a magnitude of a first component of the map relative to a magnitude of a second component of the map, wherein the second component has a higher spatial frequency than the first component.

9. The method of image processing according to claim 8, wherein said modifying a map includes attenuating a magnitude of a third component of the map relative to the magnitude of the second component of the map, wherein the third component has a higher spatial frequency than the second component.

10. The method of image processing according to claim 1, wherein said modifying a map to increase a visibility of a characteristic of a displayed image includes modifying the map to increase a visibility of an image area having a spatial frequency greater than 0.1 cycles per degree.

11. The method of image processing according to claim 1, wherein said modifying a map to increase a visibility of a characteristic of a displayed image includes modifying the map to increase a perceptibility of features of a displayed image that are mutually separated by more than one arc-minute.

12. The method of image processing according to claim 1, wherein said modifying a map to increase a visibility of a characteristic of a displayed image includes modifying the map to increase a visibility of an area in accordance with a contrast of the area.

13. The method of image processing according to claim 1, wherein said modifying a map to increase a visibility of a characteristic of a displayed image includes modifying the map according to a contrast sensitivity function.

14. The method of image processing according to claim 1, wherein said modifying a map to increase a visibility of a characteristic of a displayed image includes modifying the map according to a predetermined feature of interest.

15. The method of image processing according to claim 1, wherein said modifying a map to increase a visibility of a characteristic of a displayed image includes modifying the map to increase a visibility of a clinically relevant feature.

16. The method of image processing according to claim 1, wherein said modifying a map to increase a visibility of a characteristic of a displayed image includes modifying the map according to a shape and size of a clinically relevant feature.

17. The method of image processing according to claim 1, wherein said modifying a map to increase a visibility of a characteristic of a displayed image includes modifying the map to increase a visibility of rounded shapes.

18. The method of image processing according to claim 1, wherein the image signal is derived from a photographic representation of living tissue obtained using at least one among a penetrating radiation and a penetrating emission.

19. The method of image processing according to claim 1, wherein the image signal is derived from an X-ray photograph.

20. The method of image processing according to claim 1, said method comprising verifying that a desired structure was not removed from the map during said modifying.

21. The method of image processing according to claim 20, wherein said verifying includes calculating a difference between the map and the modified map.

22. The method of image processing according to claim 1, wherein said modifying a map to increase a visibility of a characteristic of a displayed image includes modifying the map according to a first selected characteristic in a first region of the display, and modifying the map according to a second selected characteristic in a second region of the display, wherein the first characteristic is different than the second characteristic, and wherein the first region is separate from the second region.

23. The method of image processing according to claim 1, said method comprising calculating a plurality of correction functions based on the modified map.

24. The method of image processing according to claim 23, wherein said obtaining a display signal comprises applying, to a value of the image signal that corresponds to a pixel of the display, a correction function that corresponds to the pixel from among the plurality of correction functions.

25. The method of image processing according to claim 1, wherein the map comprises a plurality of correction functions, each of the plurality of correction functions corresponding to at least one of the plurality of pixels.

26. The method of image processing according to claim 25, wherein said obtaining a display signal comprises applying, to a value of the image signal that corresponds to a pixel of the display, a correction function that corresponds to the pixel from among the plurality of correction functions.

27. The method of image processing according to claim 1, wherein the luminance resolution of the display signal is greater than the luminance resolution of the image signal.

28. The method of image processing according to claim 1, wherein the luminance resolution of the display signal is greater than the luminance resolution of the display.

29. The method of image processing according to claim 28, said method comprising displaying the display signal on the display, said displaying including performing an error diffusion technique based on the display signal.

30. The method of image processing according to claim 1, said method comprising attenuating a component of the image signal according to a characterization of noise of an image detector.

31. The method of image processing according to claim 1, wherein said modifying a map includes modifying the map to reduce a visibility of a defective pixel of the display.

32. A data storage medium having machine-readable instructions describing the method of image processing according to claim 1.

33. The method of image processing according to claim 1, wherein said method comprises using a correction circuit to perform said obtaining a display signal.

34. An image processing apparatus comprising:

an array of storage elements configured to store, for each of a plurality of pixels of a display, a measure of a light-output response of at least a portion of the pixel at each of a plurality of driving levels; and an array of logic elements configured to modify a map based on the stored measures and to obtain, based on the modified map and an image signal that represents at least one physical and tangible object, a display signal that is configured to cause the display to depict the at least one physical and tangible object, wherein the array of logic elements is configured to modify the map to increase a visibility of a characteristic of a displayed image during a use of the display.

35. The image processing apparatus according to claim 34, wherein said array of logic elements is configured to attenuate a magnitude of a first component of the map relative to a magnitude of a second component of the map, wherein the second component has a higher spatial frequency than the first component.

36. A method of image processing, said method comprising:

for each of a plurality of pixels of a display, obtaining a measure of a light-output response of at least a portion of the pixel at each of a plurality of driving levels;

modifying a map of the display that is based on the obtained measures, said modifying including, with respect to a magnitude of a component having a spatial period between one and fifty millimeters, decreasing a magnitude of a component having a spatial period less than one millimeter and decreasing a magnitude of a component having a spatial period greater than fifty millimeters; and based on the modified map and an image signal that represents at least one physical and tangible object, obtaining a display signal that is configured to cause the display to depict the at least one physical and tangible object.

37. A method of image processing, said method comprising:

for each of a plurality of pixels of a display, obtaining a measure of a luminance of at least a portion of the pixel in response to each of a plurality of different electrical driving levels;

to increase a visibility of a characteristic of a displayed image during a use of the display, modifying a map that is based on the obtained measures; and based on the modified map and an image signal that represents at least one physical and tangible object, obtaining a display signal that is configured to cause the display to depict the at least one physical and tangible object.

* * * * *